US011429806B2

(12) United States Patent
Cao et al.

(10) Patent No.: US 11,429,806 B2
(45) Date of Patent: Aug. 30, 2022

(54) DEVICES, SYSTEMS, AND METHODS FOR ANOMALY DETECTION

(71) Applicant: Canon Virginia, Inc., Newport News, VA (US)

(72) Inventors: Xiwu Cao, Arcadia, CA (US); Bradley Scott Denney, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 250 days.

(21) Appl. No.: 16/678,880

(22) Filed: Nov. 8, 2019

(65) Prior Publication Data
US 2020/0151496 A1 May 14, 2020

Related U.S. Application Data

(60) Provisional application No. 62/758,281, filed on Nov. 9, 2018.

(51) Int. Cl.
*G06K 9/00* (2022.01)
*G06K 9/62* (2022.01)
*G06V 10/50* (2022.01)

(52) U.S. Cl.
CPC .......... *G06K 9/623* (2013.01); *G06K 9/6256* (2013.01); *G06V 10/50* (2022.01)

(58) Field of Classification Search
None
See application file for complete search history.

(56) References Cited

U.S. PATENT DOCUMENTS

| 6,005,978 A  | 12/1999 | Garakani  |
| 6,320,976 B1 | 11/2001 | Murthy    |
| 7,318,005 B1 | 1/2008  | Smaragdis |
| 7,440,607 B1 | 10/2008 | Lin       |
| 7,715,623 B2 | 5/2010  | Ling      |
| 8,107,717 B2 | 1/2012  | Maeda     |
| 8,131,107 B2 | 3/2012  | Sun       |
| 8,238,635 B2 | 8/2012  | Can       |

(Continued)

FOREIGN PATENT DOCUMENTS

JP    2015108522 A  *  6/2015

OTHER PUBLICATIONS

J. Hassan et al., Welding Defect Detection and Classification Using Geometric Features, Dec. 2012.

(Continued)

*Primary Examiner* — Sean M Conner
(74) *Attorney, Agent, or Firm* — Canon U.S.A., Inc. IP Division

(57) ABSTRACT

Devices, systems, and methods obtain one or more training images; obtain a test image; select one or more associated pixels in the training images for a target pixel in the training images; calculate respective value relationships between a value of the target pixel and respective values of the associated pixels in the training images; select one or more associated pixels in the test image for a target pixel in the test image; and detect an anomaly in the target pixel in the test image based on the respective value relationships between the value of the target pixel and the respective values of the associated pixels in the training images and on respective value relationships between a value of the target pixel and respective values of the associated pixels in the test image.

17 Claims, 17 Drawing Sheets

(56) References Cited

U.S. PATENT DOCUMENTS

| | | | |
|---|---|---|---|
| 8,345,949 B2 | 1/2013 | Zhao | |
| 8,442,301 B2 | 5/2013 | Dragovich | |
| 8,867,787 B2 | 10/2014 | Singamsetti | |
| 9,170,543 B2 | 10/2015 | Arakawa | |
| 9,256,920 B1 | 2/2016 | Choudhury | |
| 9,378,552 B2 | 6/2016 | Sato | |
| 9,400,256 B2 | 7/2016 | Henderkott | |
| 9,405,991 B2 | 8/2016 | Sharma | |
| 9,460,490 B2 | 10/2016 | Choudhury | |
| 9,619,755 B2 | 4/2017 | Wang | |
| 2006/0245635 A1* | 11/2006 | Ishikawa | G06T 7/001 382/149 |
| 2008/0101686 A1* | 5/2008 | Sali | G01N 21/95607 382/149 |
| 2009/0238432 A1 | 9/2009 | Can | |
| 2009/0279772 A1 | 11/2009 | Sun | |
| 2013/0148987 A1 | 6/2013 | Arakawa | |
| 2014/0270489 A1 | 9/2014 | Lim | |
| 2014/0348415 A1 | 11/2014 | Bhattad | |
| 2015/0221076 A1* | 8/2015 | Gao | G06T 7/001 382/149 |
| 2015/0227809 A1 | 8/2015 | Alpert | |
| 2017/0140516 A1 | 3/2017 | Maher | |
| 2018/0114092 A1 | 4/2018 | Huang | |
| 2019/0285980 A1* | 9/2019 | Yoshikawa | G03F 1/84 |

OTHER PUBLICATIONS

Mick Kingsbury, Complex Wavelets for Shift Invariant Analysis and Filtering of Signals, May 2001.
Roumen Kountchev et al., Defects detection in X-ray images and photos, Feb. 2011.
V Lashkia, Defect detection in X-ray images using fuzzy reasoning, Image and Vision Computing, vol. 19, Issue 5, Apr. 2001, Abstract.
Shekhar B. Sastry, Computationally Efficient Methods for Shift-variant Image Restoration in Two and Three Dimensions, Sep. 2011.
An T. Young et al., Fundamentals of Image Processing, Jul. 2004.
Tian Yuan et al., Automatic Defect Detection in X-Ray Images Using Image Data Fusion, Dec. 2006.
Caixia Zheng et al., An improved method for object detection in astronomical images, Jun. 2015.
Richard Szeliski, Computer Vision: Algorithms and Applications, pp. i-73, Sep. 2010.
Richard Szeliski, Computer Vision: Algorithms and Applications, pp. 73-174, Sep. 2010.
Richard Szeliski, Computer Vision: Algorithms and Applications, pp. 174-266, Sep. 2010.
Richard Szeliski, Computer Vision: Algorithms and Applications, pp. 267-363, Sep. 2010.
Richard Szeliski, Computer Vision: Algorithms and Applications, pp. 363-466, Sep. 2010.
Richard Szeliski, Computer Vision: Algorithms and Applications, pp. 467-575, Sep. 2010.
Richard Szeliski, Computer Vision: Algorithms and Applications, pp. 577-679, Sep. 2010.
Richard Szeliski, Computer Vision: Algorithms and Applications, pp. 679-776, Sep. 2010.
Richard Szeliski, Computer Vision: Algorithms and Applications, pp. 777-789 and 933-957, Sep. 2010.

* cited by examiner (A) image (B) image after removing sides (C) mask (D) mask-applied image

# DEVICES, SYSTEMS, AND METHODS FOR ANOMALY DETECTION

CROSS-REFERENCE TO RELATED APPLICATIONS

This application claims the benefit of U.S. Application No. 62/758,281, which was filed on Nov. 9, 2018.

BACKGROUND

Technical Field

This application generally concerns the detection of anomalies in images, such as the nondestructive detection of anomalies in an object using an image of the object.

Background

Nondestructive testing techniques are used to examine the properties of objects without causing damage to the objects. These techniques can be used in a quality-control process to identify defects in the object.

SUMMARY

Some embodiments of a device comprise one or more computer-readable storage media and one or more processors in communication with the one or more computer-readable storage media. The one or more computer-readable storage media and the one or more processors are configured to cause the device to obtain one or more training images; obtain a test image; select one or more associated pixels in the training images for a target pixel in the training images; calculate respective value relationships between a value of the target pixel and respective values of the associated pixels in the training images; select one or more associated pixels in the test image for a target pixel in the test image; and detect an anomaly in the target pixel in the test image based on the respective value relationships between the value of the target pixel and the respective values of the associated pixels in the training images and on respective value relationships between a value of the target pixel and respective values of the associated pixels in the test image.

Some embodiments of a method comprise obtaining training images; obtaining a test image; selecting one or more respective associated pixels in the training images for each of a plurality of corresponding target pixels in the training images, wherein the plurality of corresponding target pixels correspond across the training images, and wherein the one or more respective associated pixels of each target pixel in the plurality of corresponding target pixels are included in a same training image of the one or more training images as the target pixel; selecting one or more respective associated pixels in the test image for a target pixel in the test image, wherein each of the one or more respective associated pixels in the test image correspond to at least one of the one or more respective associated pixels in the training images; and detecting an anomaly in the target pixel in the test image based on respective values of the plurality of corresponding target pixels and respective values of the respective associated pixels of the plurality of target pixels in the training images and on a value of the target pixel and respective values of the respective associated pixels in the test image.

Some embodiments of one or more computer-readable storage media store instructions that, when executed by one or more computing devices, cause the one or more computing devices to perform operations that comprise obtaining training images; selecting a plurality of corresponding target pixels in the training images; selecting, for each corresponding target pixel of the plurality of corresponding target pixels, one or more respective corresponding associated pixels in the training images, wherein each target pixel of the plurality of corresponding target pixels and the one or more respective associated pixels of the target pixel are included in a same training image of the training images and the corresponding target pixels and the corresponding associated pixels correspond across the training images; obtaining a test image; selecting a target pixel in the test image corresponding to one or more of the plurality of corresponding target pixels in the training images; selecting one or more respective associated pixels in the test image for the target pixel in the test image, wherein each of the respective associated pixels in the test image corresponds to a respective one or more of the respective corresponding associated pixels in the training images; and performing anomaly detection on the target pixel in the test image based on a value of the target pixel and respective values of the respective associated pixels in the test image and on respective values of the plurality of corresponding target pixels and respective values of the respective corresponding associated pixels of the plurality of corresponding target pixels in the training images.

DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein.

Figure 1:
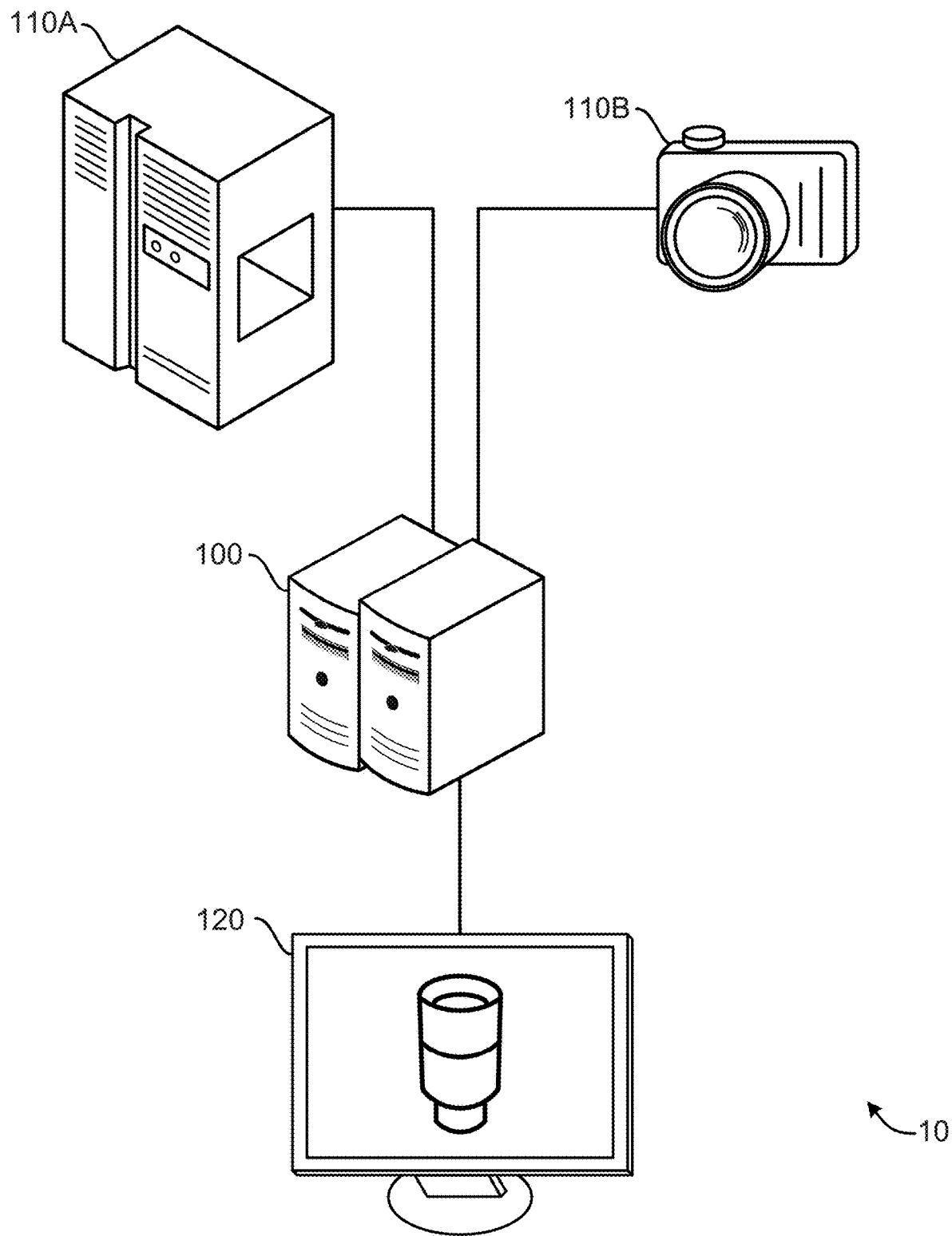
FIG. 1 illustrates an example embodiment of an anomaly-detection system.

FIG. 1 illustrates an example embodiment of an anomaly-detection system. The anomaly-detection system 10 includes one or more anomaly-detection devices 100, which are specially-configured computing devices (e.g., specially-configured computer-vision devices); one or more image-capturing devices, such as an x-ray device 110A or a camera 110B; and at least one display device 120.

The one or more anomaly-detection devices 100 are configured to detect anomalies in input images (e.g., x-ray images) based on the input images and on one or more training images. An anomaly in an image of an object may indicate a defect in the object in the location of the anomaly.

Figure 2:
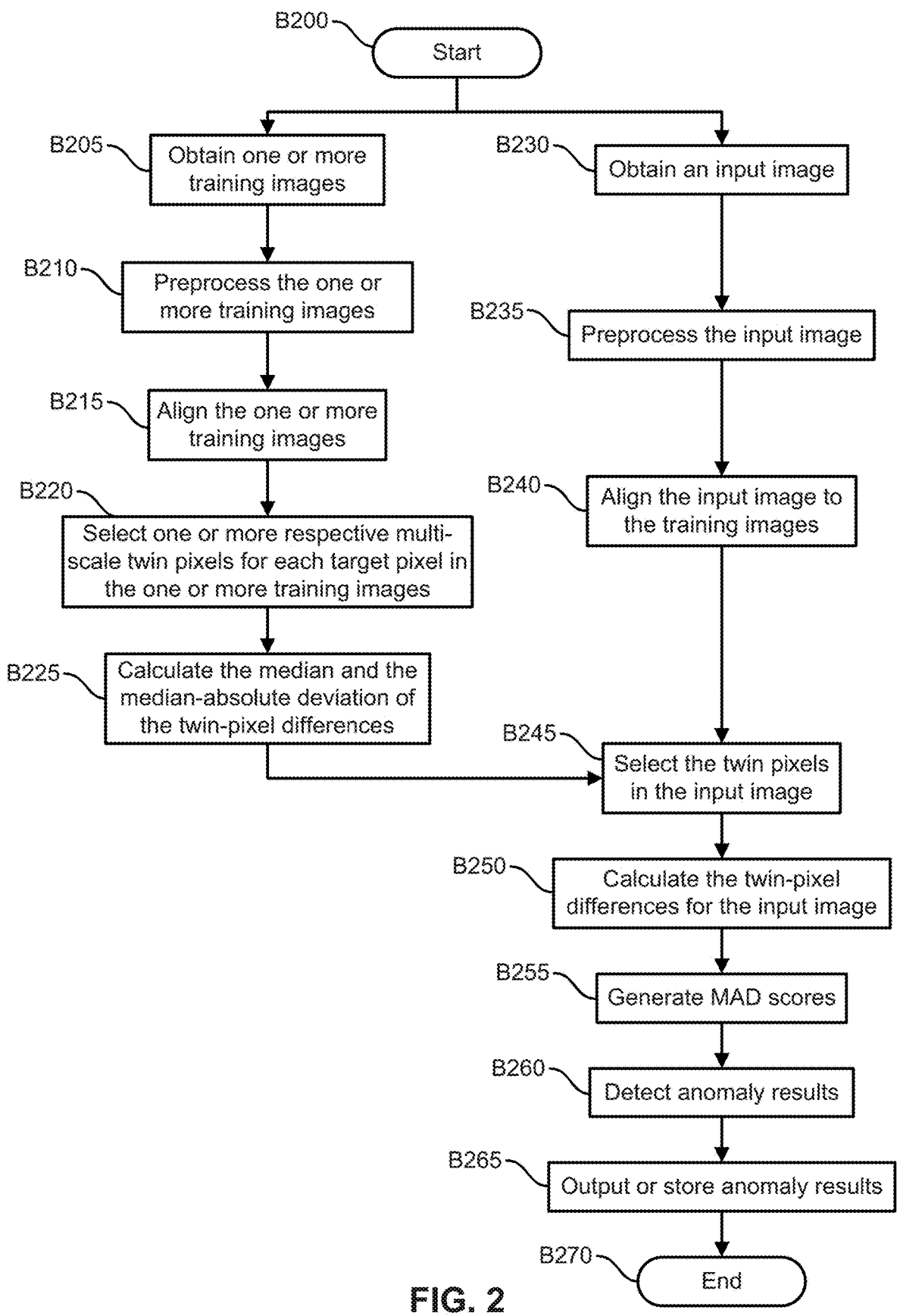
FIG. 2 illustrates an example embodiment of an operational flow for anomaly detection.

FIG. 2 illustrates an example embodiment of an operational flow for anomaly detection. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by an anomaly-detection device, some embodiments of these operational flows are performed by two or more anomaly-detection devices or by one or more other specially-configured computing devices.

The operational flow in FIG. 2 starts in block B200 and then splits into a first flow and a second flow. In this embodiment, the first flow implements a training phase. The first flow proceeds to block B205, where the anomaly-detection device obtains one or more training images (e.g., some images of a defect-free object, some images of an object that includes defects).

Figure 3:
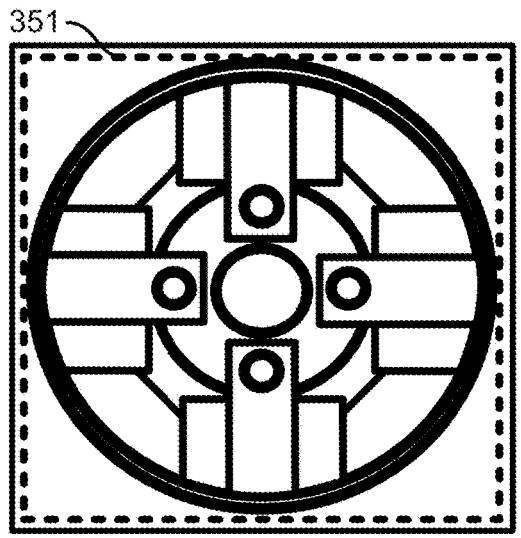
FIG. 3 illustrates an example embodiment of image preprocessing.
Figure 3:
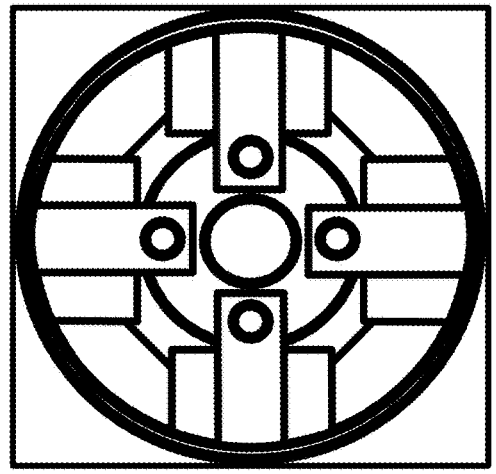
Figure 3:
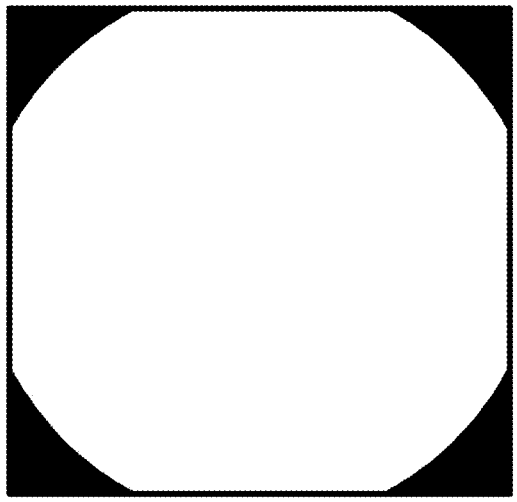
Figure 3:
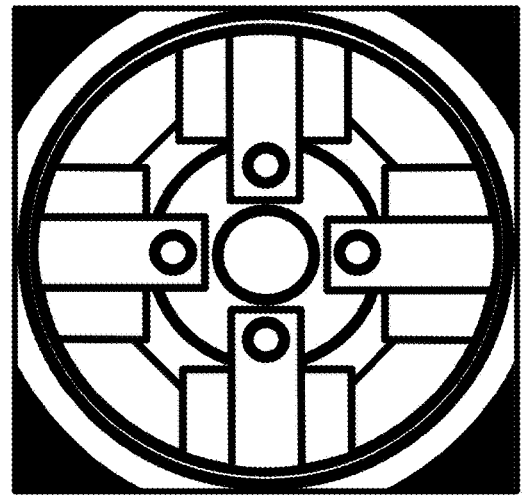

Next, in block B210, the anomaly-detection device preprocesses the one or more images. For example, some embodiments of the preprocessing include two operations. The first operation removes (e.g., deletes, cuts out) invalid, unwanted, or irrelevant areas from each training image. For example, the preprocessing may remove the areas of the image (A) in FIG. 3 that are outside the bounding box 351. In FIG. 3, (B) shows the image after the areas that are outside of the bounding box 351 have been removed.

The second preprocessing operation generates a mask for the image. For example, the mask may be generated based on intensity thresholding or information about the spatial structure of the object in the image. In FIG. 3, (C) shows an example of a mask, and (D) shows the image after the mask has been applied.

After block B210, the first flow moves to block B215. In block B215, the anomaly-detection device aligns the training images, for example by selecting an image and aligning all other training images to the selected image. The first flow then moves to block B220. Embodiments that obtain only one training image do not perform block B215.

Figure 4:
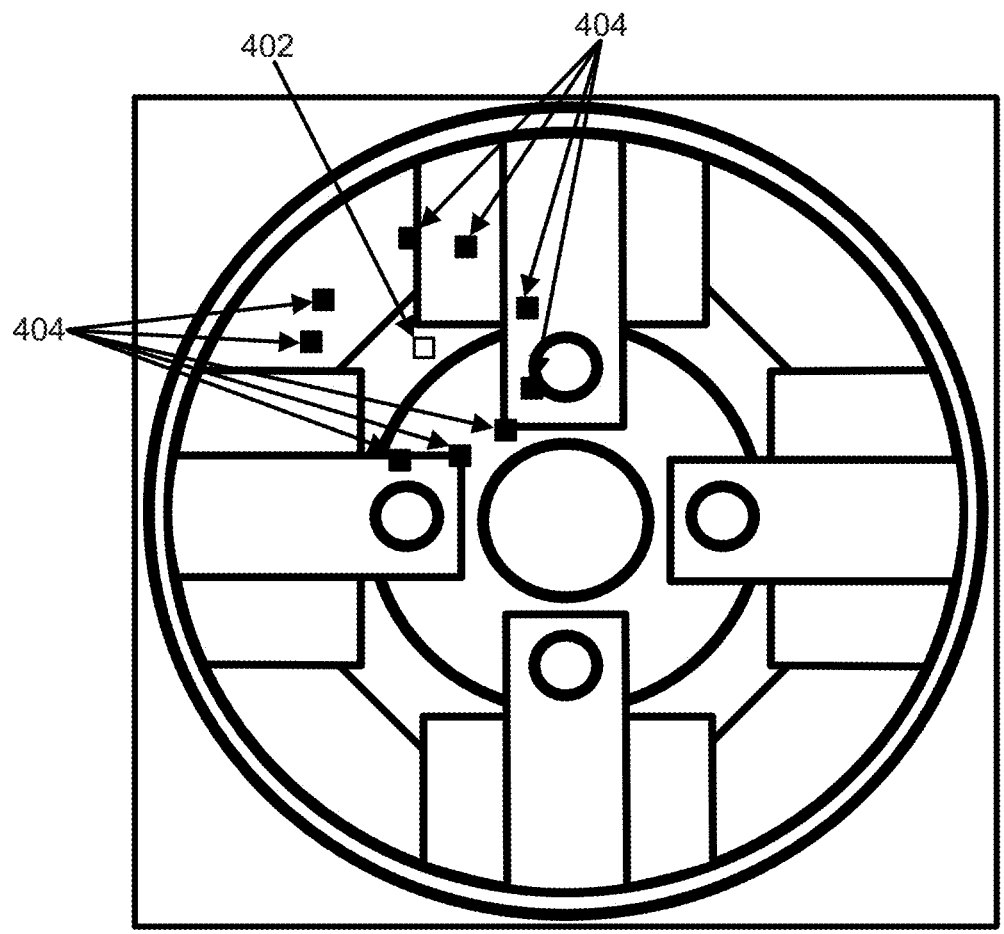
FIG. 4 illustrates an example embodiment of a target pixel and its twin pixels.
Figure 5:
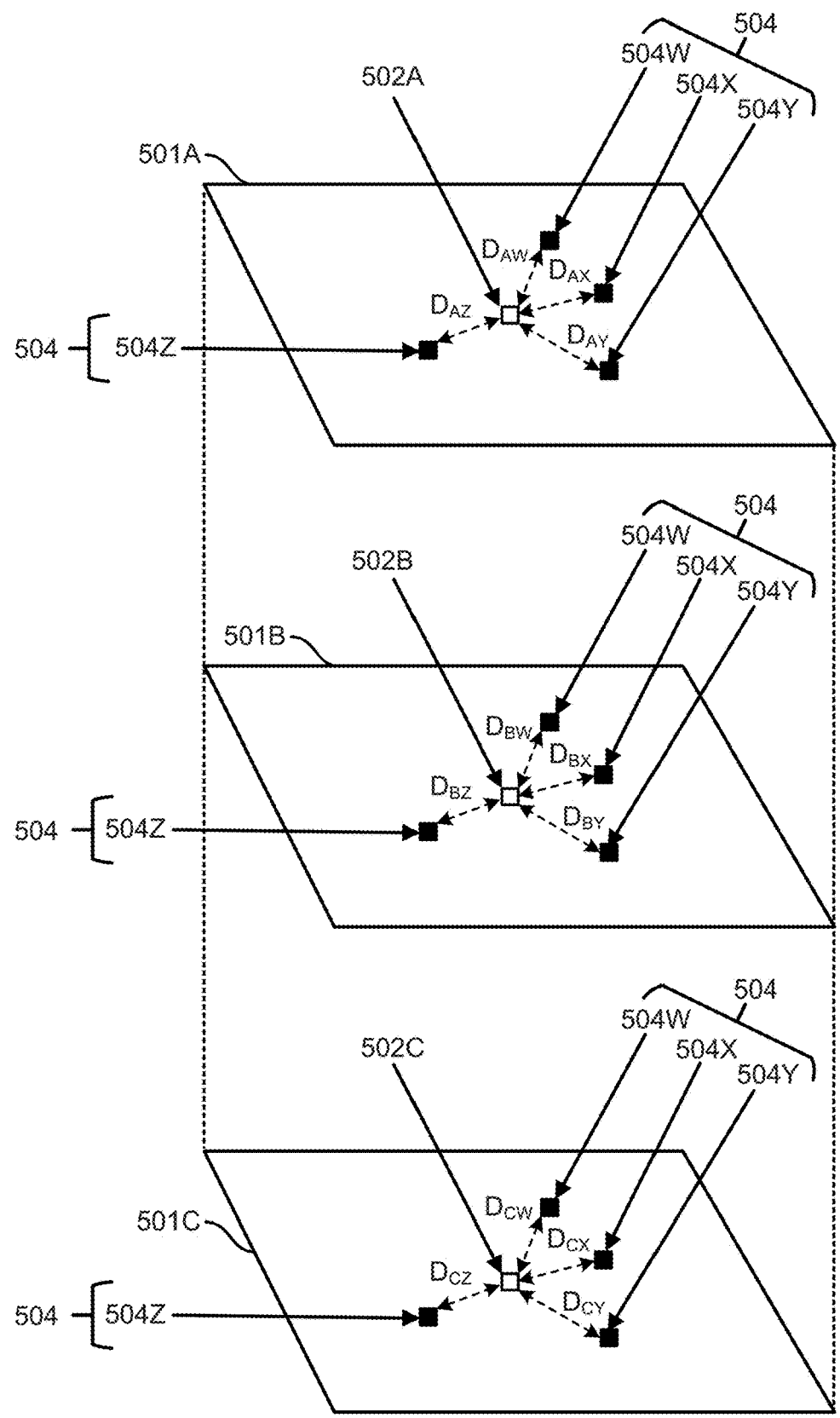
FIG. 5 illustrates an example embodiment of corresponding target pixels and their respective twin pixels.

In block B220, the anomaly-detection device selects one or more respective associated pixels ("twin pixels") for one or more of the pixels in the one or more training images. The respective twin pixels of a pixel are pixels for which the pixel-value differences relative to the pixel are calculated (for example, as illustrated in FIG. 5). In some embodiments, each of a pixel's twin pixels are pixels that are in the neighborhood and in the same image. FIG. 4 illustrates an example embodiment of a pixel 402 and its associated pixels 404 (twin pixels 404). When referring to a pixel for which one or more twin pixels will be or have been selected, the pixel may be referred to herein as a "target pixel." Thus, in FIG. 4, the pixel 402 is a target pixel. A pixel may be both a target pixel and a twin pixel to another target pixel. For example, in FIG. 4, each of the twin pixels 404 may also be a target pixel, and the pixel 402 may be a twin pixel to another target pixel. In some embodiments, each pixel in an image is used as a target pixel. Also, the value of a pixel may represent intensity.

Figure 7:
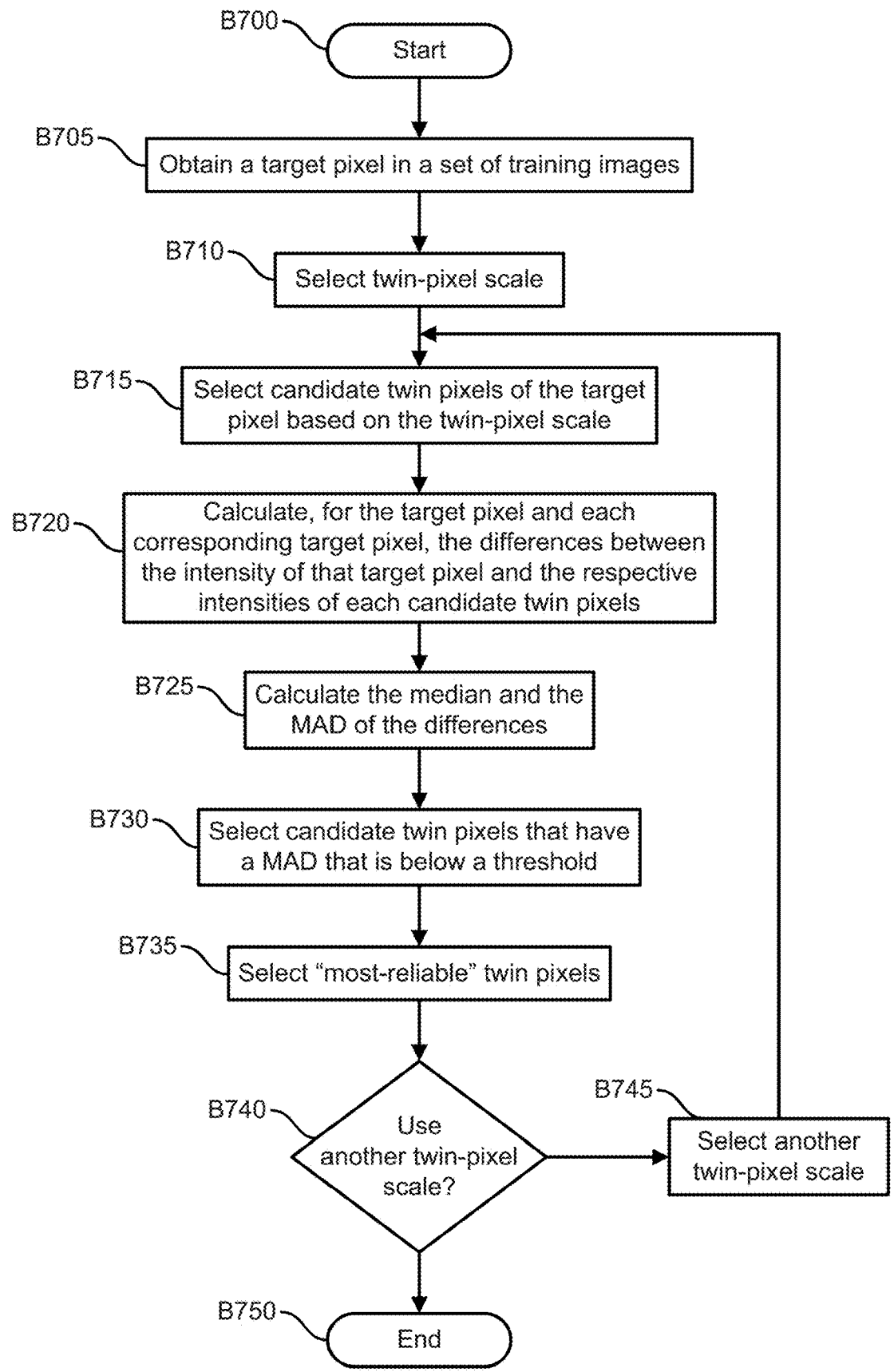
FIG. 7 illustrates an example embodiment of an operational flow for twin-pixel selection.

To select the twin pixels for a target pixel, some embodiments of the anomaly-detection device perform the operational flow that is described in FIG. 7. Also, for example, to select the respective twin pixels for a target pixel, some embodiments of the anomaly-detection device use similarity in value variation or similarity in spatial organization.

Next, in block B225, the anomaly-detection device calculates one or more centrality and variation such as one or more medians and one or more median-absolute deviations (MADs) of the twin-pixel differences of corresponding target pixels and their twin pixels, for example. Corresponding target pixels are target pixels that have the same or similar positions (e.g., x,y coordinates) in their respective images. Also, the twin pixels of a target pixel may have respective corresponding twin pixels in other images. Corresponding twin pixels are twin pixels that have the same or similar positions (e.g., x,y coordinates) in their respective images or a corresponding relative position from their target pixel across training images.

A twin-pixel difference is a difference between the value of a target pixel and the value of a twin pixel of the target pixel. A median of the twin-pixel differences is the median of multiple twin-pixel differences, for example the twin-pixel differences of corresponding target pixels. A MAD of the twin-pixel differences is the MAD of multiple twin-pixel differences, for example the twin-pixel differences of corresponding target pixels across the training images.

For example, FIG. 5 illustrates an example embodiment of corresponding target pixels and their respective twin pixels. FIG. 5 includes three training images 501A-C, and each training image has a respective one of the corresponding target pixels 502A-C. The corresponding target pixels 502A-C are located in the same position (e.g., x,y coordinates) in the training images 501A-C. If the images are images of instances of the same type of object and are aligned, then each of the corresponding target pixels 502A-C shows the same location on the object.

FIG. 5 also shows the respective twin pixels 504 of each of the target pixels 502A-C. The twin pixels 504 in the first image 501A include four twin pixels 504W-Z, the twin pixels 504 in the second image 501B include four twin pixels 504W-Z, and the twin pixels 504 in the third image 501C include four twin pixels 504W-Z. In this example, each twin pixel 504 has two corresponding twin pixels-a respective one in each of the other two training images. Thus, twin pixels 504W correspond to each other, twin pixels 504X correspond to each other, twin pixels 504Y correspond to each other, and twin pixels 504Z correspond to each other.

For each of the target pixels 502A-C, four respective twin-pixel differences ($D_{.w}$, $D_{.x}$, $D_{.y}$, and $D_{.z}$) are calculated—respective difference for each of the target pixel's respective twin pixels 504. The median and the MAD of the twin-pixel differences between the values of the corresponding target pixels 502A-C and the values of their respective twin pixels 504 are then calculated. The median and the MAD may be the median and the MAD of the differences between the values of corresponding target pixels and one twin pixel per target pixel where all of the twin pixels are corresponding twin pixels. For example, in some embodiments, the median of the twin-pixel differences $\{D_{Ax}, D_{Bx},$ and $D_{Cx}\}$ between the target pixels 502A-C and corresponding twin pixels 504X is calculated, and the MAD of the twin-pixel differences $\{D_{Ax}, D_{Bx},$ and $D_{Cx}\}$ between the target pixels 502A-C and corresponding twin pixels 504X is calculated. Also for example, in some embodiments, the median of the twin-pixel differences $\{D_{Ay}, D_{By},$ and $D_{Cy}\}$ between the target pixels 502A-C and corresponding twin pixels 504Y is calculated, and the MAD of the twin-pixel differences $\{D_{Ay}, D_{By},$ and $D_{Cy}\}$ between the target pixels 502A-C and corresponding twin pixels 504Y is calculated. Thus, for the example in FIG. 5, such embodiments calculate four medians and four MADs of twin-pixel differences, and each of the four medians and the four MADS of the twin-pixel differences is calculated based on three respective twin-pixel differences.

Also, the median and the MAD may be the median and the MAD of the differences between the values of corresponding target pixels and all of their respective twin pixels. For example, in some embodiments, the median of the twin-pixel differences $\{D_{Aw}, D_{Ax}, D_{Ay}, D_{Az}, D_{Bw}, D_{Bx}, D_{By}, D_{Bz}, D_{Cw}, D_{Cx}, D_{Cy},$ and $D_{Cz}\}$ between the target pixels 502A-C and each of their twin pixels 504 is calculated, and the MAD of the twin-pixel differences $\{D_{Aw}, D_{Ax}, D_{Ay}, D_{Az}, D_{Bw}, D_{Bx}, D_{By}, D_{Bz}, D_{Cw}, D_{Cx}, D_{Cy},$ and $D_{Cz}\}$ between the target pixels 502A-C and each of their twin pixels 504 is calculated.

The medians and MADs of the twin-pixel differences may be stored in respective maps. For example, if each pixel is a target pixel that has five twin pixels, then some embodiments will generate ten maps: five maps will show median values for each twin pixel, and five maps will show the MAD values for each twin pixel. Also, the maps may be arranged in the form of an image, so that the position of a value in a map corresponds to the position of the target pixel in the image. Some embodiments use means and standard deviations or use medians and interquartile ranges (IQR) instead of, or in addition to, medians and MAD values. Some embodiments use other combinations of measures of centrality/normalcy and variation.

After block B225, the first flow proceeds to block B245.

From block B200, the second flow moves to block B230, where the anomaly-detection device obtains an input image (e.g., a test image). Next, in block B235, the anomaly-detection device preprocesses the input image. The second flow then proceeds to block B240, where the anomaly-detection device aligns the input image with one or more of the training images.

Next, in block B245, the anomaly-detection device selects, for each target pixel in the input image, the twin pixels that correspond to the twin pixels of at least one of the corresponding target pixels in the training images (the twin pixels of the corresponding target pixel that were selected in block B220). In some embodiments, the anomaly-detection device uses each pixel in the image as a target pixel for which twin pixels are selected. The second flow proceeds to block B250, where the anomaly-detection device calculates the twin-pixel differences for the target pixels and their respective twin pixels in the input image.

Then, in block B255, the anomaly-detection device generates at least one respective twin-pixel MAD score for one or more target pixels (e.g., each pixel) in the input image. For example, in some embodiments, the twin-pixel MAD scores for a target pixel are based on that target pixel's respective twin-pixel differences from block B250 and on that target pixel's corresponding median and MAD from block B225.

Also for example, the calculation of a twin-pixel MAD score by some embodiments of the anomaly-detection device can be described by equation (1):

$$\text{Score}_{TPMAD} = \frac{\text{Diff}_{Tp} - \text{Median\_diff}_{set}}{\text{MAD\_diff}_{set}}, \qquad (1)$$

where $\text{Score}_{TPMAD}$ is the twin-pixel MAD score of one twin pixel for a target pixel in the input image, $\text{Diff}_{Tp}$ is the difference between the value of the target pixel and the value of the one twin pixel in the input image, and $\text{Median\_diff}_{set}$ and $\text{MAD\_diff}_{set}$ are the median and MAD of the difference calculated in block B225 (e.g., in the training phase). In some embodiments, the $\text{Score}_{TPMAD}$ is defined as the absolute value of the score given by equation (1).

The flow then proceeds to block B260, where the anomaly-detection device detects which pixels, if any, in the input image have an anomaly based on the twin-pixel MAD scores. For example, depending on the number of twin pixels selected, some embodiments may have multiple twin-pixel MAD scores from multiple twin pixels for the same target pixel. Thus, some embodiment of the anomaly-detect device use a strategy based on majority voting or arithmetic mean to determine if a pixel is an anomaly or not. Also, some embodiments use two-level thresholding to detect the pixels that have anomalies. And some embodiments, such as embodiments that do not include block B255, base the anomaly detection on the twin-pixel differences without generating MAD scores or medians of the twin-pixel differences. For example, some embodiments may use a threshold on a sum of the respective twin-pixel differences of a target pixel to detect an anomaly at that target pixel.

Figure 6:
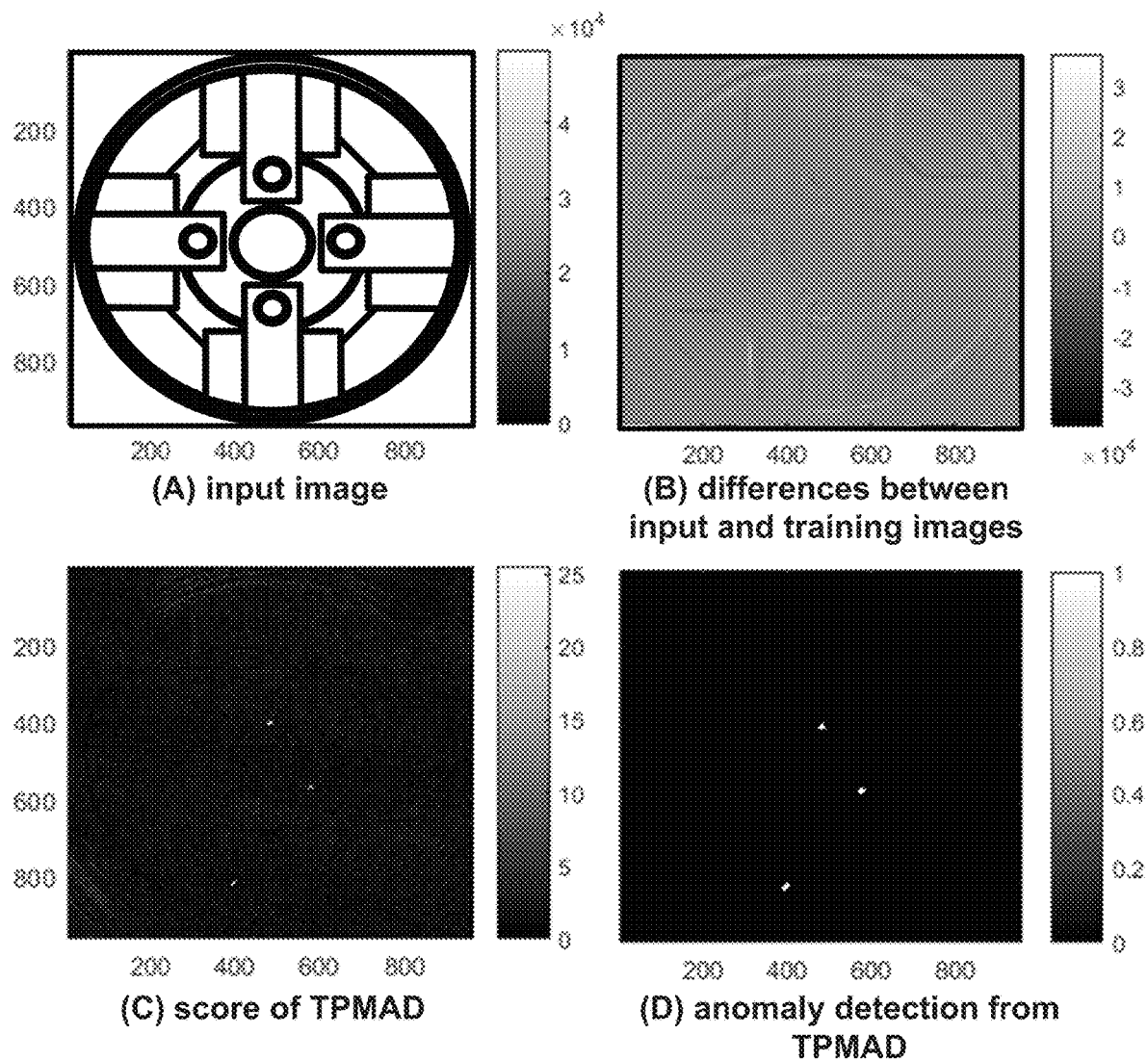
FIG. 6 illustrates an example embodiment of twin-pixel anomaly-detection results.

FIG. 6 illustrates an example embodiment of twin-pixel anomaly-detection results. In FIG. 6, (A) shows the unprocessed input image, and (B) shows the differences between the input image and a training image. (C) shows the twin-pixel MAD scores (TPMAD) (e.g., as generated in block B255) for each pixel. (D) shows the results of the anomaly detection, which were generated by applying two-level thresholding to the TPMAD scores.

In block B265, the anomaly-detection device outputs or stores the anomaly results, and then the flow ends in block B270.

Also, some embodiments combine blocks B220 and B225, for example as shown in FIG. 7, which illustrates an example embodiment of an operational flow for twin-pixel selection. The flow starts in block B700 and then moves to block B705, where the anomaly-detection device obtains a target pixel in a set (e.g., stack) of training images. Next, in block B710, the anomaly-detection device obtains a twin-pixel scale, which indicates the distance between the target pixel and each of the target pixel's twin pixels.

Figure 8:
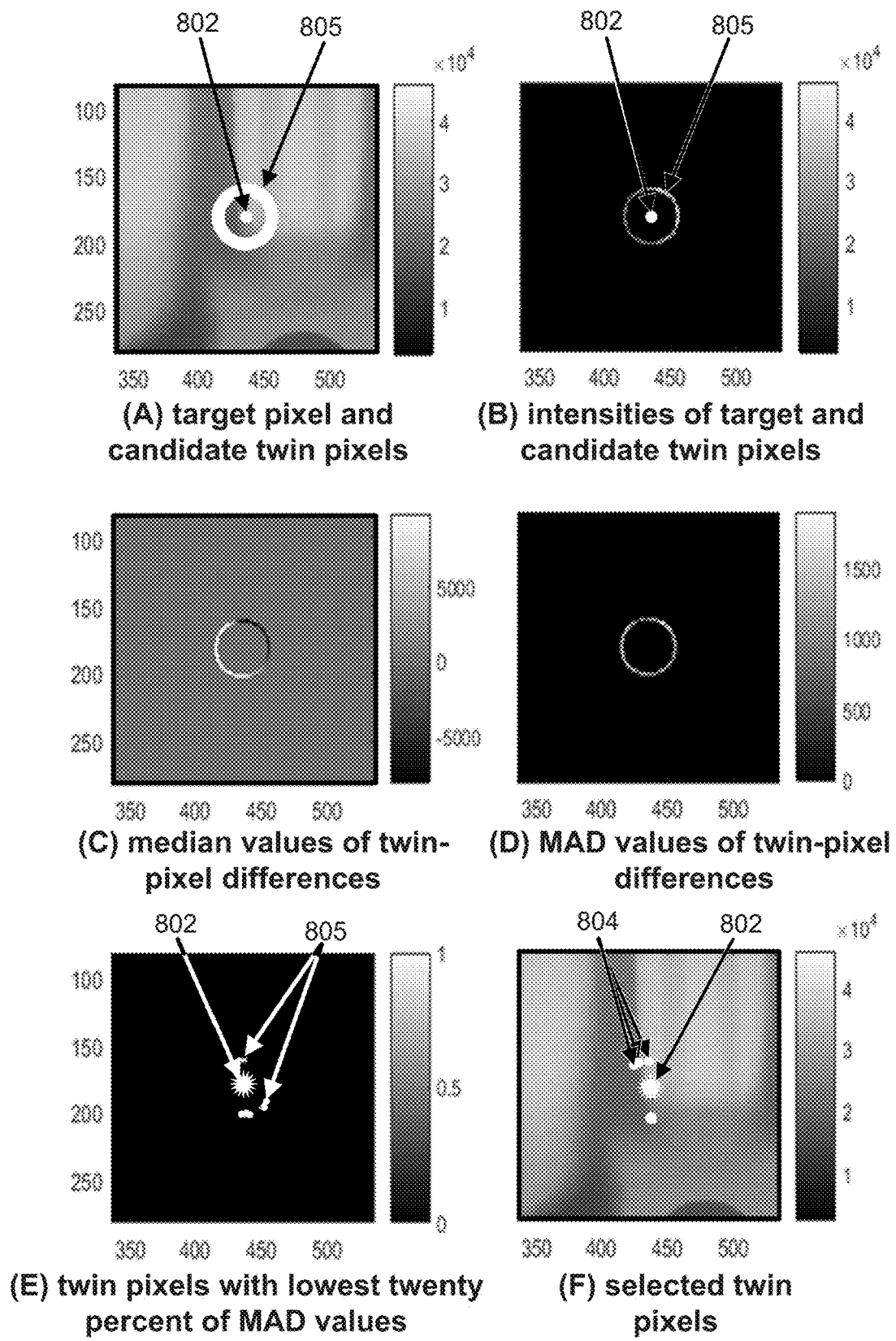
FIG. 8 illustrates example embodiments of a target pixel and candidate twin pixels.

The flow proceeds to block B715, where the anomaly-detection device selects candidate twin pixels of the target pixel based on the twin-pixel scale, for example as shown in FIG. 8. FIG. 8 illustrates example embodiments of a target pixel 802 and candidate twin pixels 805, as indicated in (A). The twin-pixel scale in this embodiment is 20 pixels—accordingly, the respective distance between the target pixel 802 and each candidate twin pixel 805 is 20 pixels. In (B), to emphasize the twin pixels 805, the intensities of all pixels that are not the target pixel 802 or one of the candidate twin pixels 805 are shown in black.

Referring again to FIG. 7, the flow then moves to block B720, where the anomaly-detection device calculates the twin-pixel differences between the target pixel and the candidate twin pixels. These operations are also performed for the corresponding target pixels of the target pixel in each of the training images in the set of training images.

Next, in block B725, the anomaly-detection device calculates the median and the MAD of the twin-pixel differences for the target pixel and its corresponding target pixels. For example, in FIG. 8, (C) shows the median values of the twin-pixel differences, and (D) shows the MAD values of the twin-pixel differences. The MAD values may indicate how stable or unstable the relationships are between the target pixel and the candidate twin-pixels.

The flow then moves to block B730, where the anomaly-detection device selects the candidate twin pixels that have MAD values that are below a threshold (e.g., a percentile). In FIG. 8, (E) shows the candidate twin pixels 805 that have the lowest twenty percent of MAD values. Higher MAD values may indicate unstable relationships. Some embodiments also include block B735, where the anomaly-detection device selects the "most-reliable" twin pixels, for example by sorting the twin pixels according to MAD values and then selecting the twin pixels that have the lowest MAD values. In FIG. 8, (F) shows the target pixel 802 and the selected twin pixels 804, which are the "most-reliable" twin pixels in this example. Although blocks B730 and B735 may generate good results, as an alternative to one or both of blocks B730 and B735, some embodiments select twin pixels either randomly or evenly spaced (e.g., evenly spaced from a designated area or evenly spaced in angle and at an approximate radius around a designated point, such as the target pixel location), for example to increase computation speed.

The flow then proceeds to block B740, where the anomaly-detection device determines whether to use another twin-pixel scale to select more twin pixels. If the anomaly-detection device determines to use another twin-pixel scale (block B740=Yes), then the flow moves to block B745, where the anomaly-detection device selects another twin-pixel scale, and the flow returns to block B715. Otherwise (block B740=No) the flow ends in block B750.

Figure 9:
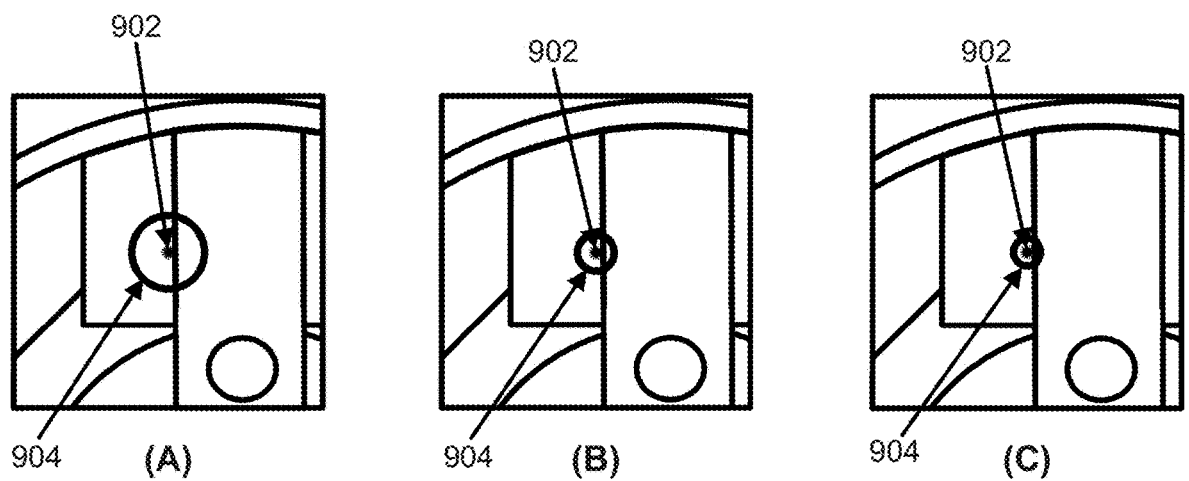
FIG. 9 illustrates an example embodiment of multi-scale twin pixels.

Accordingly, some embodiments of the anomaly-detection device select multi-scale twin-pixels. FIG. 9 illustrates an example embodiment of multi-scale twin pixels. In FIG. 9, three scales are used when selecting the twin pixels 904 of a target pixel 902, where (A), (B) and (C) have three different radii (e.g., 20 pixels, 10 pixels, 5 pixels). Accordingly, in some embodiments that use multi-scale twin-pixel MAD scores to detect anomalies, the output of anomaly detection is a combination of the anomaly detection in each scale. Also, some embodiments generate multiple MAD scores for each pixel.

Figure 10:
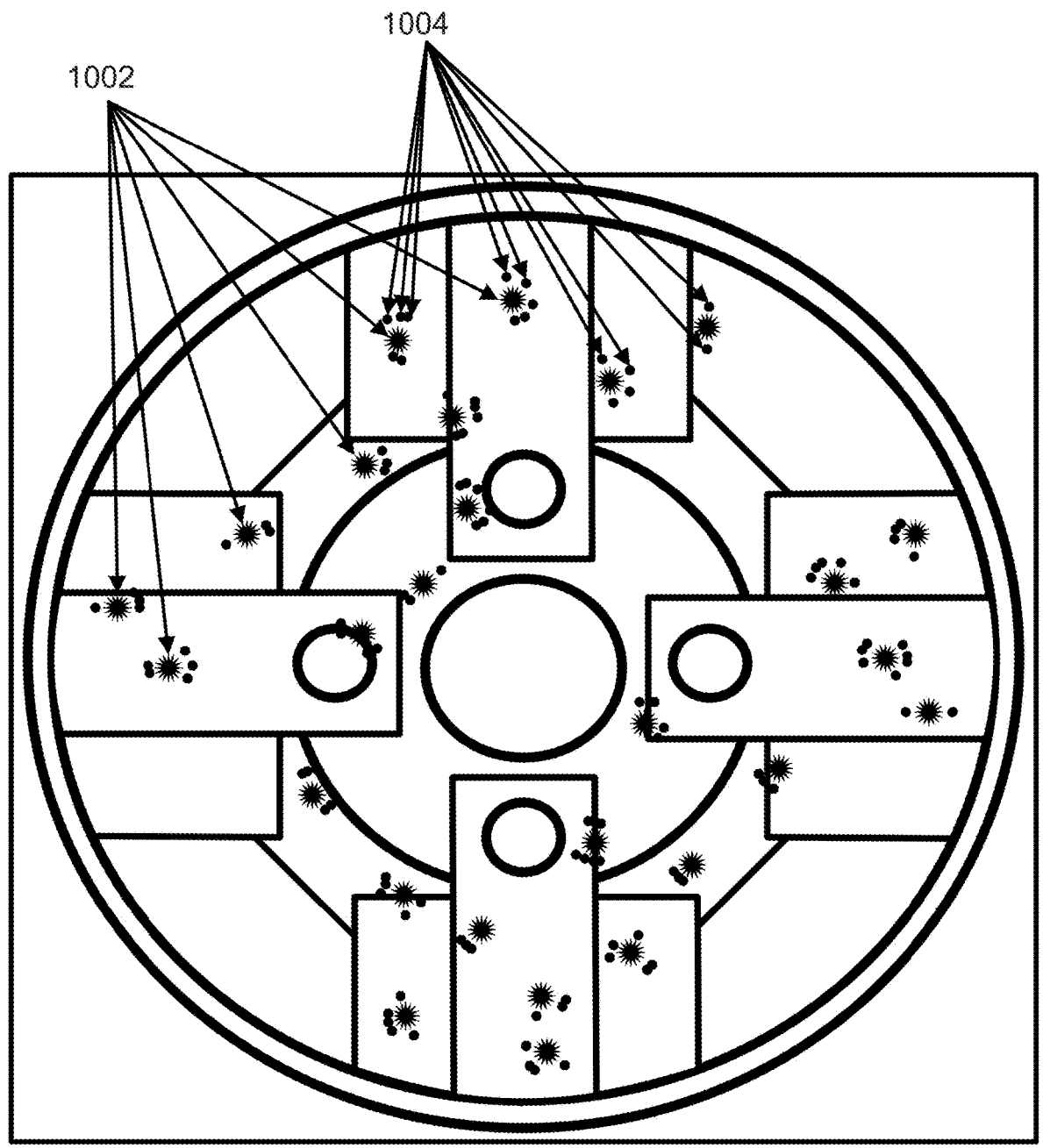
FIG. 10 illustrates example embodiments of target pixels and respective twin pixels.

And FIG. 10 illustrates example embodiments of target pixels and respective selected twin pixels. FIG. 10 shows target pixels 1002 (shown as the star-shaped markers) and their respective twin pixels 1004.

Therefore, some embodiments of the anomaly-detection device that use the twin-pixel differences (e.g., twin-pixel MAD scores) for anomaly detection use the target pixel's value differences with associated pixels (twin pixels) in the target pixel's neighborhood of the same image, rather than the target pixel's value alone, as a basic measure (e.g., difference measure) to compare the image with training images. One advantage of not directly using the pixel values as the basic measure for comparison is the elimination of the need to match the pixel-value distribution of the training images, which could introduce some extra systematic bias because the amount of pixel-value variations across the images that are generated during their image capture may not be known.

Thus, some embodiments of the anomaly-detection device use the pixel-value differences in the neighborhood within the same image as a basic measure for anomaly detection. This may eliminate much of the pixel-value adjustments (e.g., intensity adjustment) because, if there are some external variations (e.g., variations in the image-capturing system) that influence a target pixel's value, the variations may also influence the pixel values in the target pixel's neighborhood.

In addition, using the pixel-value differences in the target pixel's neighborhood as measures may also decrease the importance of image alignment. If a target pixel is not aligned well with its corresponding pixels from the training images (e.g., such that the target pixel and its corresponding pixels do not show the same location on an object) and has some X and Y shifts, the pixels in the target pixel's neighborhood may also have the same X and Y shifts, thus compensating to some extent for the misalignments.

Figure 11:
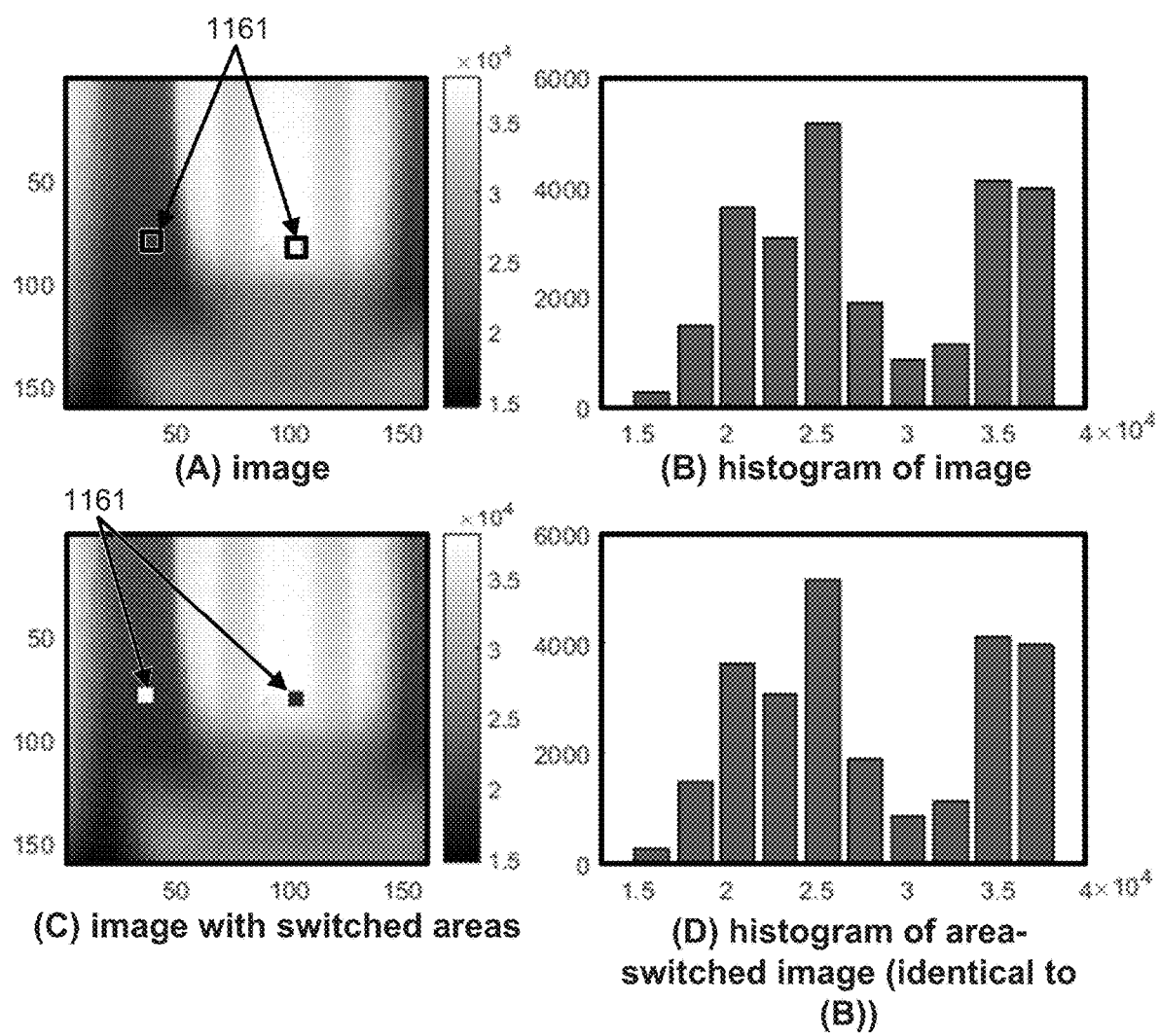
FIG. 11 illustrates example embodiments of image patches and histograms.

Also, twin-pixel-based embodiments of the anomaly-detection devices may improve sensitivity to texture in images. In contrast to the texture sensitivity of the twin-pixel-based embodiments, histogram-based embodiments may lack texture sensitivity. FIG. 11 illustrates example embodiments of image patches and histograms. In FIG. 11, (A) shows an example of an image, and (B) shows the image's histogram. (C) shows the image from (A) after the positions of two areas 1161 were switched. (D) shows the histogram of the image in (C), and the histogram in (D) is identical to the histogram in (B). Thus, even though the patches in (A) and (C) are different, as shown in (B) and (D), their histograms are identical.

Figure 12:
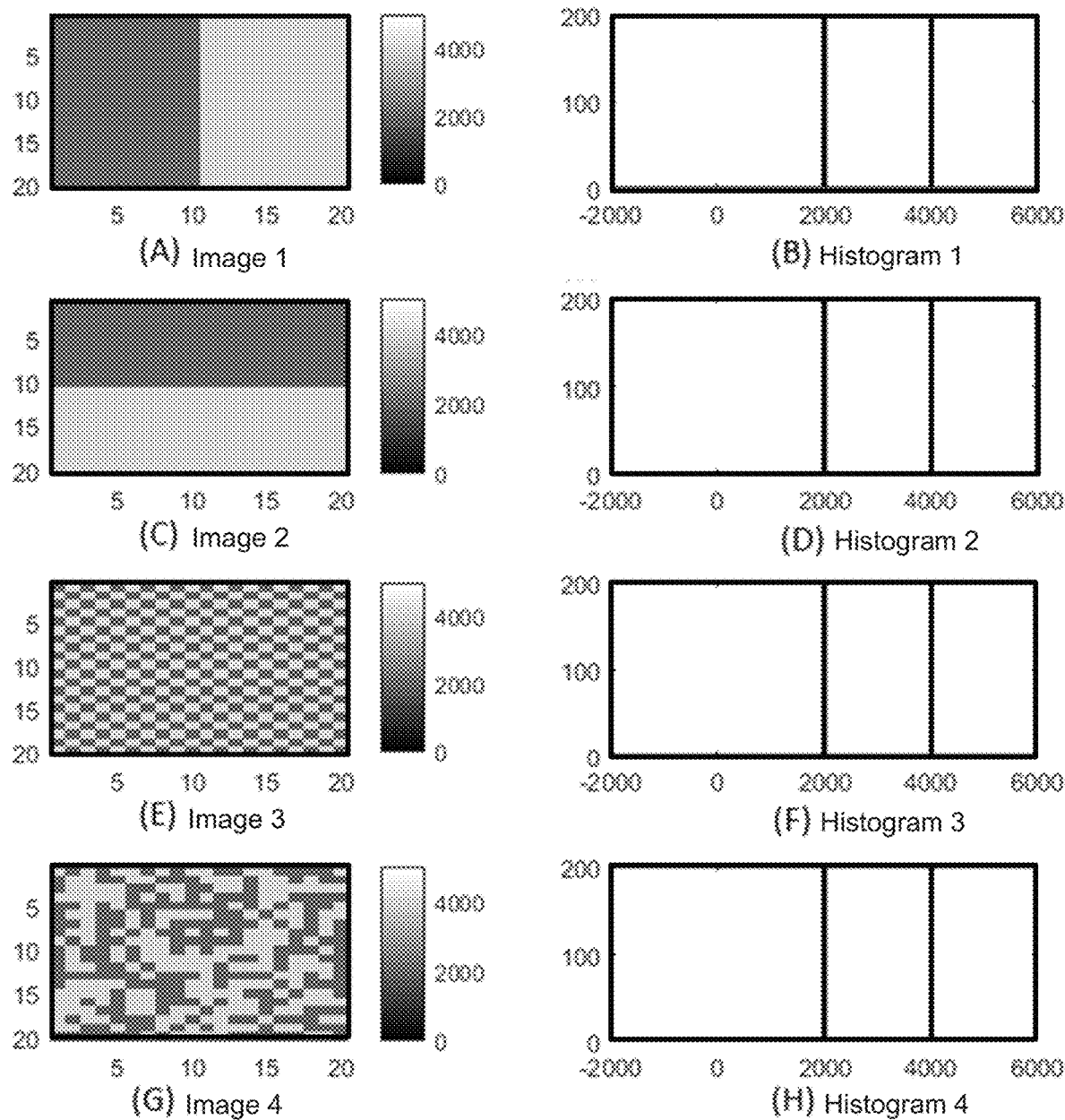
FIG. 12 illustrates example embodiments of image patches and histograms.

Also, FIG. 12 illustrates example embodiments of image patches and their respective histograms. Although, in FIGS. 12, (A), (C), (E), and (G) are not identical, (A), (C), (E), and (G) contain the exact same number of pixels with a value of 2000 and with a value of 4000. Thus their value histograms, which are shown in (B), (D), (F), and (H), are identical.

Additionally, histogram-based embodiments require a patch around each pixel to build the characteristics of the pixel. Thus, these embodiments cannot easily reach a pixel-level resolution in anomaly detection. First, if the patch has only a few pixel anomalies, the anomalies may be washed out after the histogram of the patch is calculated, particularly if the magnitudes of the anomalies' pixels are not strong. Second, histogram-based embodiments require histogram calculation around the patches for each pixel within the image, causing redundant computations and time consumption. Third, even if a device can calculate a histogram for each pixel, precisely locating the anomalies at a pixel level is still difficult because the histogram is inherently based on a patch, not a pixel.

Figure 13:
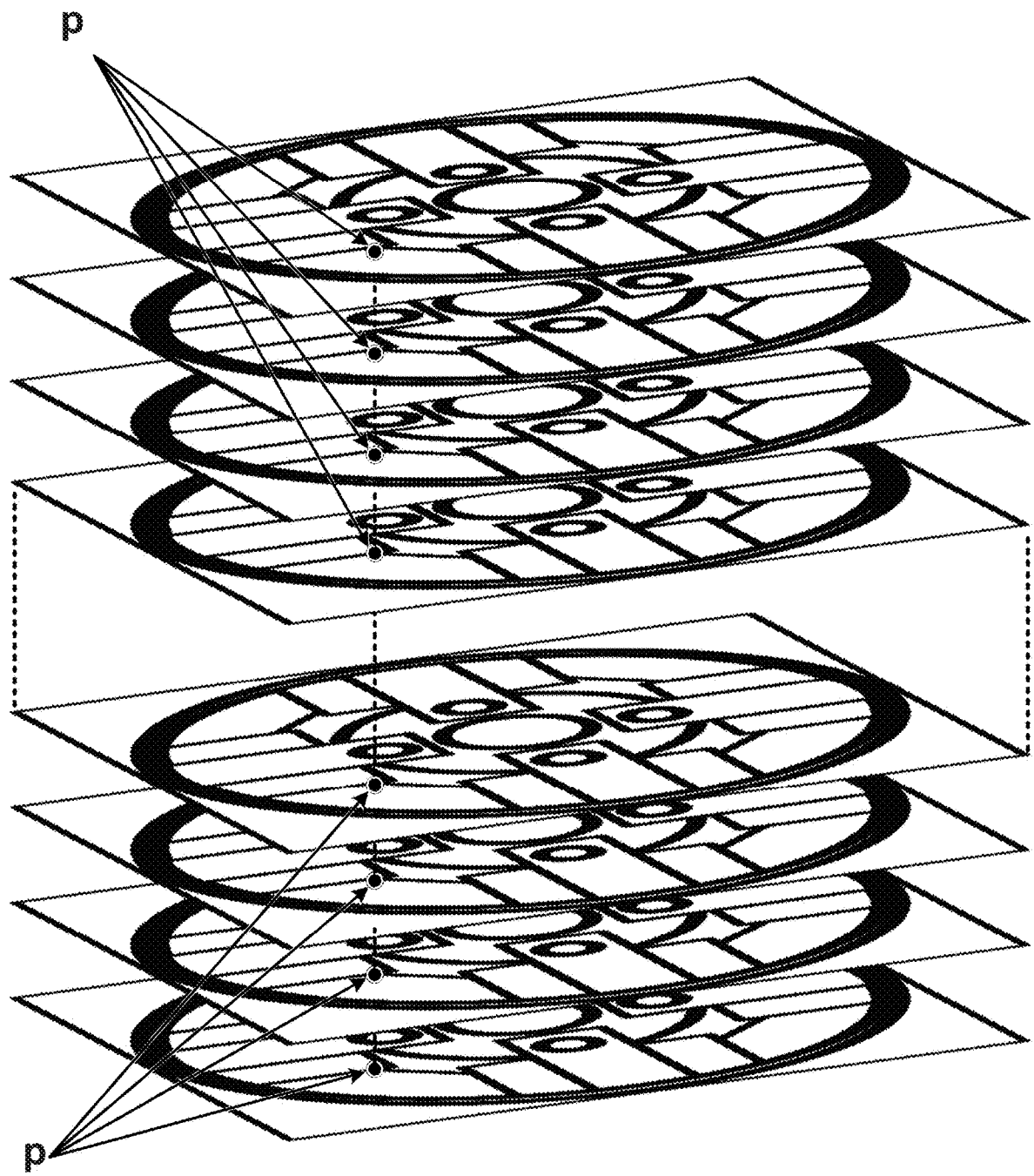
FIG. 13 illustrates an example embodiment of aligned and stacked training images.

Moreover, the twin-pixel-based embodiments have advantages over single-pixel-based embodiments. In contrast to the twin-pixel-based and histogram-based embodiments, in some single-pixel-based embodiments, a group of training images are first aligned to a training image (e.g., a pre-selected image) in the training phase and then stacked. For example, FIG. 13 shows an example embodiment of aligned and stacked training images. For each pixel position, such as position p, some of these embodiments collect all the corresponding pixel values in the different images across the whole stack and calculate the median and MAD pixel value for this position. Then, in the detection phase, a score is generated for each pixel based on its difference from the median, as described in equation (2):

$$\text{Score}_{PMAD} = \frac{\text{Adj\_intensity}_p - \text{Median}_{set}}{\text{MAD}_{set}}, \quad (2)$$

where $\text{Score}_{PMAD}$ is the pixel's MAD score, where $\text{Adj\_intensity}_p$ is the adjusted pixel value for each pixel in the input image, and $\text{Median}_{set}$ and $\text{MAD}_{set}$ are the median and MAD (median absolute deviation) of the value of the pixel's position across the whole stack.

Once the MAD scores are estimated for all the pixels in the input image, single-pixel-based embodiments use a threshold (e.g., on the absolute value of the MAD score) to identify all those pixels that are considered to be anomalies because of their high MAD scores (e.g., $\text{Score}_{PMAD}$).

Some single-pixel-based embodiments rely on pixel value (e.g., intensity) adjustment because pixel-value differences between images are used to detect anomalous pixels in single-pixel-based embodiments and because pixel-value variations could be produced by defects in the objects shown in the images, by changes or variations in the image-capturing equipment (e.g., an X-ray source, X-ray detector), and by inconsistencies in the positioning of the objects shown in the images. Accordingly, a pixel of an image cannot be directly compared to all the other corresponding pixels in other images without a pixel-value adjustment—otherwise the values of the pixels are not comparable and could introduce many false-positive anomaly detections. For example, to adjust pixel values, some single-pixel-based embodiments use a cumulative distribution function to adjust the value of each pixel in a patch such that the output cumulative functions of two compared patches are identical. Also for example, some single-pixel-based embodiments use parameters estimated from the patch (e.g., mean, standard deviation) and then shift values such that the parameters estimated from the patch are identical.

Figure 14:
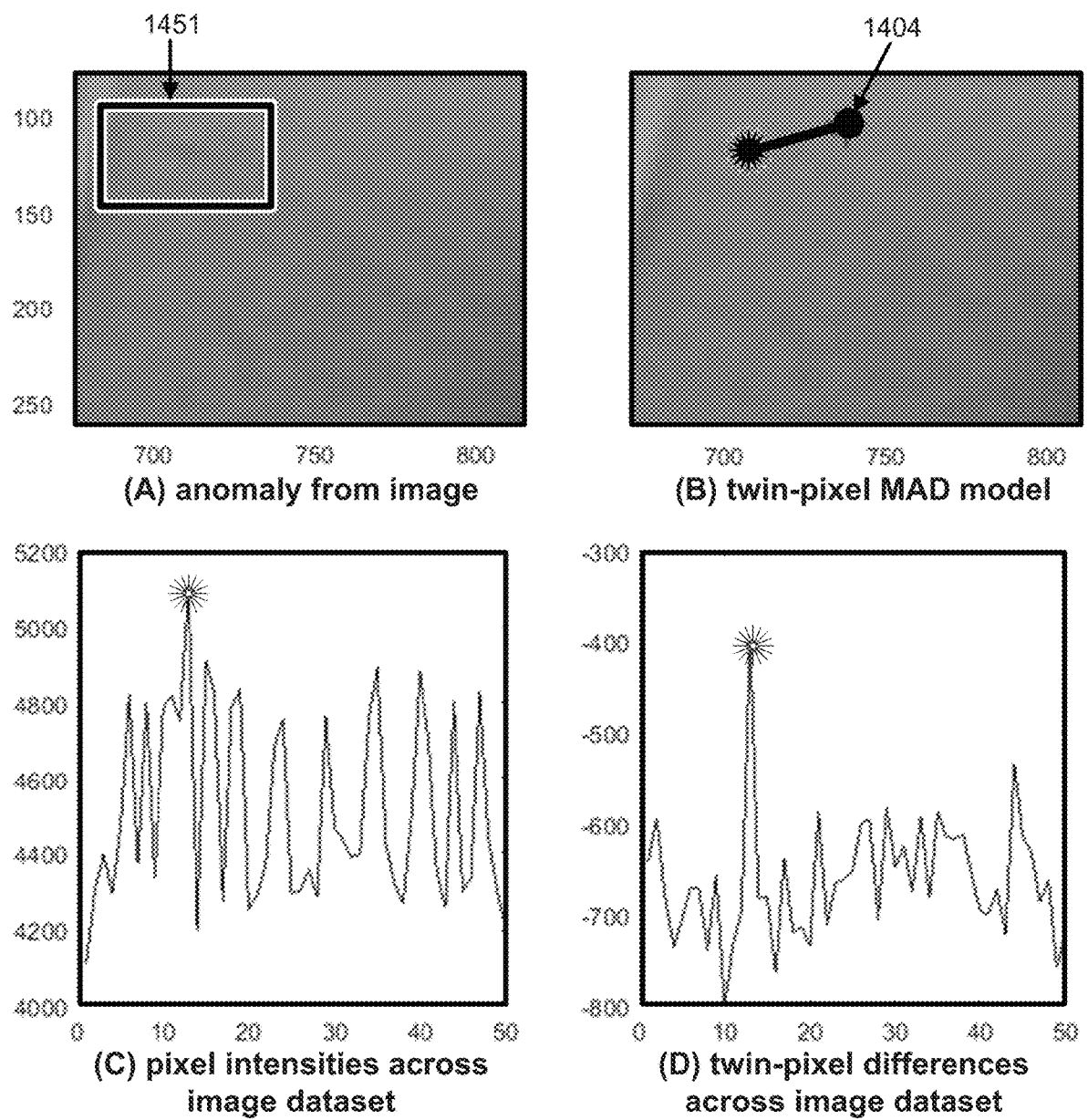
FIG. 14 illustrates an example of a comparison of a single-pixel-based embodiment and a twin-pixel-based embodiment.

FIG. 14 illustrates an example of a comparison of a single-pixel-based embodiment and a twin-pixel-based embodiment. In FIG. 14, (A) shows an anomalous pixel in the bounding box 1451, and (C) shows a plot of the pixel values at this position across the image dataset (e.g., a stack of fifty images), the value of the anomaly being marked in with a star. This anomaly will not be detected if a high threshold is applied, and several false positives will be detected if a low threshold is applied. In contrast, using a twin-pixel-based embodiment (which includes a twin pixel 1404), as shown in (B), the anomalous pixel stands out against all other images, as shown in (D). Accordingly, twin-pixel-based embodiments use a pixel-value difference as a measure for anomaly detection.

Figure 15:
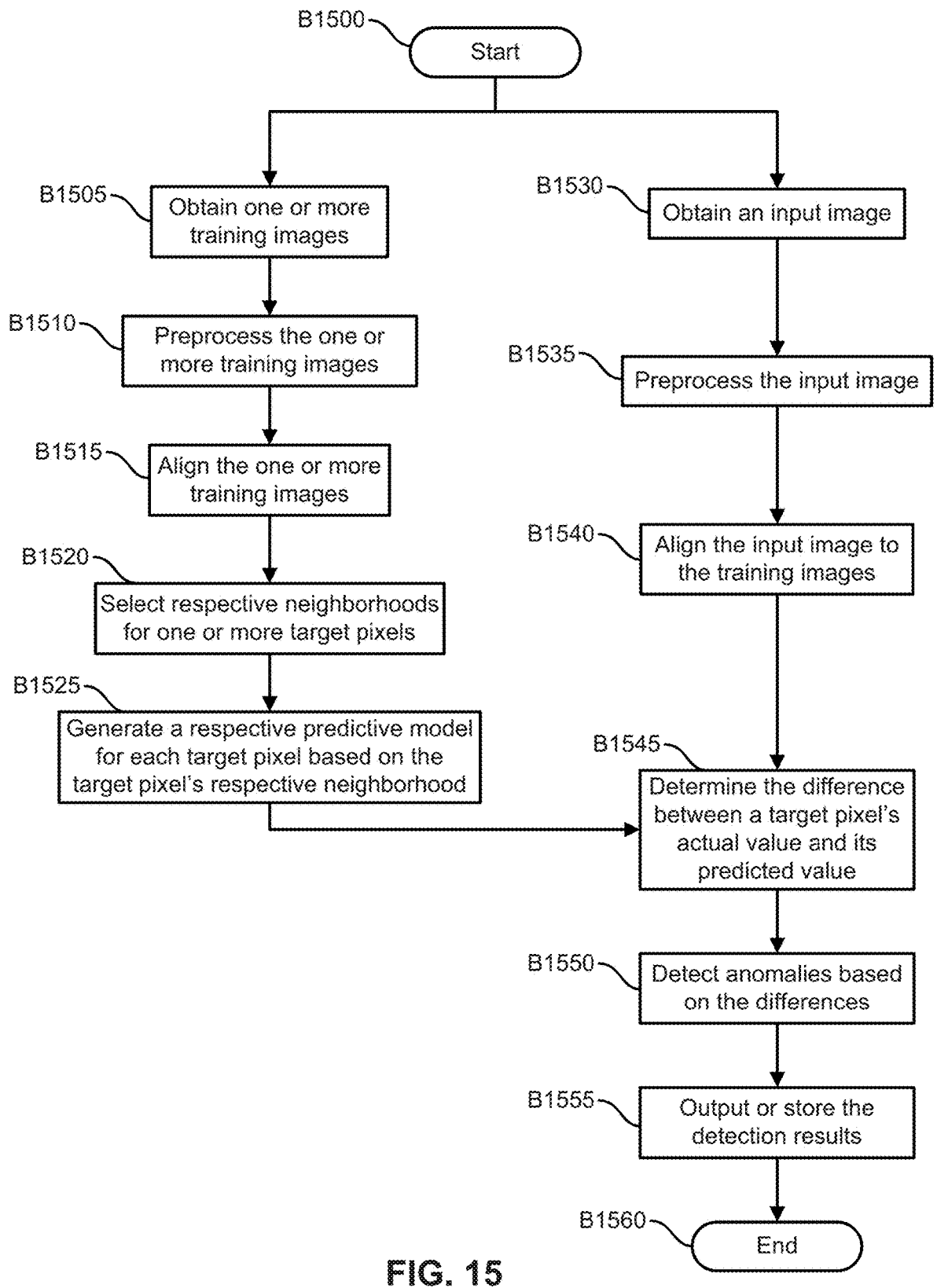
FIG. 15 illustrates an example embodiment of an operational flow for anomaly detection.

FIG. 15 illustrates an example embodiment of an operational flow for anomaly detection. The operational flow starts in block B1500 and then splits into a first flow and a second flow. The first flow proceeds to block B1505, where the anomaly-detection device obtains one or more training images (e.g., images of a defect-free object). Next, in block B1510, the anomaly-detection device preprocesses the one or more images. Then the first flow moves to block B1515.

In block B1515, the anomaly-detection device aligns the training images, for example by selecting a first training image and aligning all other training images to the first training image. For example, in FIG. 16, the value of a pixel y can be predicted based on the values of neighborhood pixels $\{x_1, x_2, \ldots, x_8\}$. The accuracy of the prediction may be enhanced by observing the same pixel (the pixel at the same position) and same neighborhood pixels across multiple images of the same object. Thus, the multiple images are aligned in block B1515 so that the pixel y is in the same position in each image. Thus, for a given aligned pixel position i,j and image k, the value of the pixel (e.g., target pixel) may be denoted by the following:

$$y_{i,j,k}$$

The first flow then moves to block B1520.

Figure 16:
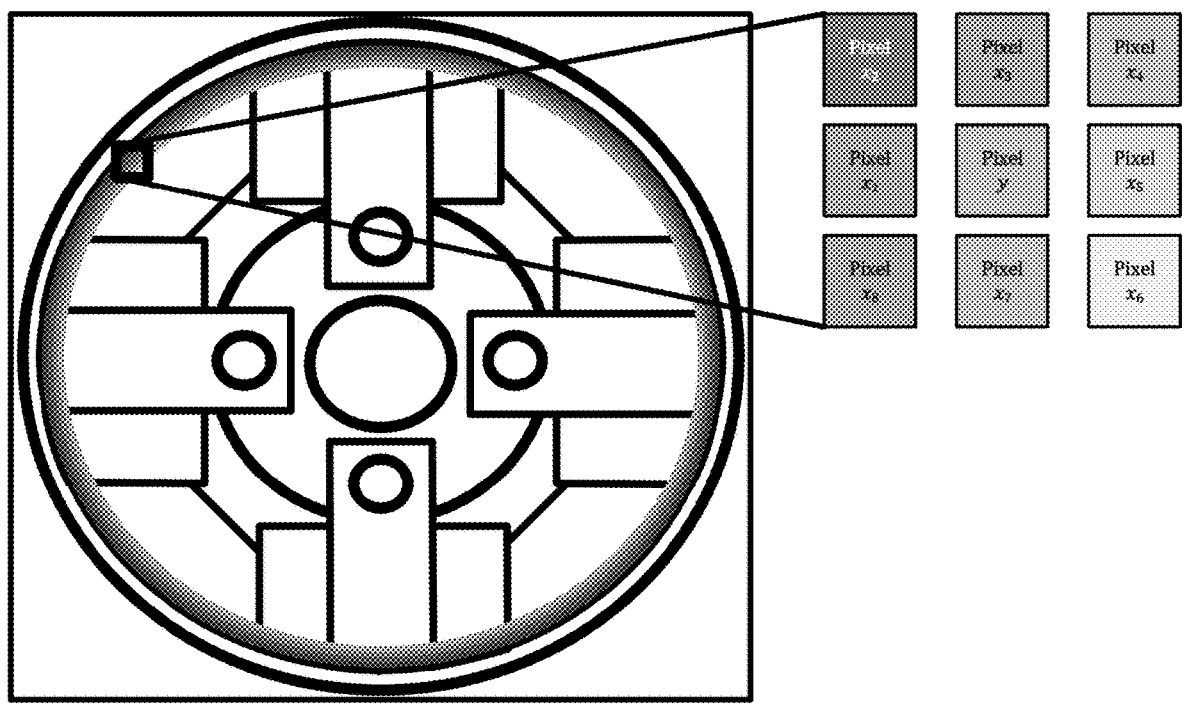
FIG. 16 illustrates an example embodiment of a target pixel and the target pixel's neighborhood.

In block B1520, the anomaly-detection device selects respective neighborhoods for one or more target pixels. A neighborhood includes one or more pixels. For example, FIG. 16 illustrates an example embodiment of a target pixel y and the target pixel's neighborhood pixels ($x_1$, $x_2$, $x_3$, $x_4$, $x_5$, $x_6$, $x_7$, $x_8$), which are twin pixels to the target pixel y. The pixels in the neighborhood may be arbitrarily selected, and the number of pixels in the neighborhood may be only one.

Also for example, the neighborhood of pixel i,j may be described as a set N of offsets from position i,j such that the reference neighborhood pixels are defined as a vector of neighborhood pixels in the image whose offsets from position i,j are in the neighborhood reference set:

$$\bar{x}_{i,j,k} = (x_{n,m,k} : (n-i, m-j) \in N). \quad (3)$$

For example, the reference neighborhood pixels $\bar{x}_{i,j,k}$ could be all the pixels in an annulus bounded by two radii, $r_1$ and $r_2$:

$$\bar{x}_{i,j,k} = \{x_{n,m,k} : r_1^2 \leq (n-i)^2 + (m-j)^2 \leq r_2^2\}. \quad (4)$$

The neighborhoods of the reference pixels can be defined at different scales and distances from the target pixel. In some embodiments, an annulus around the pixel is used as a reference neighborhood. The radius of the annulus can be varied to perform anomaly detection at one or more scales. Small radii may be good for detecting small single-pixel anomalies, while larger radii may be appropriate for larger-scale anomalies. In image regions where the reference neighborhood extends outside of the image or the region of interest of an image, the neighborhood may be truncated to those neighbors that are in a valid region.

Next, in block B1525, the anomaly-detection device generates a respective predictive model for each target pixel based on the target pixel's respective neighborhood. In some embodiments, the anomaly-detection device can use the predictive model to predict the value (e.g., intensity value) of a given pixel at a given position (e.g., a target pixel) based on the values of the pixels in the pixel's neighborhood.

The predictive model may be described as a regression problem. For example, in some embodiments, the regression model is linear, and $\hat{y}_{i,j,k}$ can be described by the following:

$$\hat{y}_{i,j,k} = a^T \bar{x}_{i,j,k} + b, \quad (5)$$

where $\hat{y}_{i,j,k}$ is the predicted value.

When this model is repeatedly constructed for multiple target pixels (e.g., each target pixel), the pixel-position subscripts can be removed and the expression can be simplified to $$\hat{y}_k = a^T \bar{x}_k + b. \tag{6}$$

The coefficients a and b can be solved by minimizing an objective function, for example as described by the following:

$$\min_{a,b} \sum_{k \in normal} (y_k - a^T \bar{x}_k - b)^2 + \lambda(a^T a + b^2), \tag{7}$$

where $\lambda(a^T a + b^2)$ is a regularization term that prevents the regression from overfitting. This may be especially advantageous when the number of neighborhood pixels is large relative to the number of training image (e.g., training images). Also, the summation for a target pixel is performed over all the images in a group of images that show an object that is not anomalous (e.g., non-defective) in the target pixel's position and in the reference neighborhood of the pixel. This eliminates any contribution from defect regions or anomalies.

Sometimes, at least some of the normal and abnormal images are not labeled, and some embodiments of the anomaly-detection device perform operations to exclude outliers in the regression calculation. For example, some embodiments of the anomaly-detection device minimize a median squared error instead of the sum. Also for example, some embodiments of the anomaly-detection device perform the regression in a first pass, and images that produce large errors (outlier predictions) are excluded in a second pass as if the outlier cases are assumed to not be normal. And in some embodiments of the anomaly-detection device, algorithms (e.g., RANSAC) are used to perform regression that is more robust to outliers in the training data.

Additionally, in some embodiments, the regression offset parameter b is not included in the regularization term. And in some embodiments, the regularization term $\lambda(a^T a + b^2)$ has another form, for example those using $L_0$, $L_1$, $L_2$ norm regularization. Some embodiments use Lasso regression in lieu of ridge regression to perform the optimization operations.

In embodiments where the number of training images is larger than the number of model parameters, the regularization term may not be used or the parameter $\lambda$ can become arbitrarily small (e.g., zero).

Equation (7) can be modified by augmenting the vector $\bar{x}_k$ to include a constant term of 1. Then the coefficient b can be captured in the augmented parameter vector $\tilde{a}$, for example as follows:

$$\min_{\tilde{a}} \sum_{k \in normal} (y_k - \tilde{a}^T \tilde{x}_k)^2 + \lambda(\tilde{a}^T \tilde{a}). \tag{8}$$

This can be also be described in vector and matrix form where $y = [y_1, y_2, y_3 \ldots]$ and $X = [\tilde{x}_1 \, \tilde{x}_2 \, \tilde{x}_3 \ldots]^T$. The objective function can accordingly be described as follows:

$$\min_{\tilde{a}} (y - X\tilde{a})^T (y - X\tilde{a}) + \lambda \tilde{a}^T \tilde{a}. \tag{9}$$

A solution that minimizes this objective function is the regularized pseudo inverse:

$$\tilde{a} = (X^T X + \lambda I)^{-1} X^T y. \tag{10}$$

In this regularized solution, the data is normalized so that the same regularization parameter applies across the entire set of image pixels. Alternatively, the regularization parameter could scale according to local variations in the reference neighborhood.

While the above-described embodiments implement linear regression, some embodiments of the anomaly-detection device implement non-linear regression, such as polynomial regression or regression neural networks with non-linear neuron activations.

Furthermore, some embodiments of the anomaly-detection device perform pixel-value prediction using not only a weighted sum of the reference neighbors, but also by adding weighted sums of reference neighbors of filtered versions of the images. In these embodiments, the vector $\tilde{x}$ may include the neighborhood pixels of the original image and the neighborhood pixels of the filtered images. For example, a filtered image may have been filtered with a horizontal direction gradient and a vertical direction gradient. These two gradient images (the filtered original images), along with the original image, can be used to construct the vector $\tilde{x}$ by adding the original image reference neighborhood pixels, the horizontal gradient image reference neighborhood pixels, and the vertical gradient image reference neighborhood pixels. Moreover, some embodiments of the anomaly-detection device use other linear and non-linear image filters to enhance the reference neighborhood vector. Regularization hyper-parameters may also be adjusted for each type of regressor input (e.g., each filter may have its own regularization hyper-parameter).

Due to pixel-value variations (e.g., intensity variations) across images and modeling sensitivity to pixel-value variations, as well as potential biases in predictions based on the regularization, some embodiments apply an additional correction term on the prediction based on a predicted value of y. For example, some embodiments of the anomaly-detection device implement a parametric model of the prediction error that can be described by the following:

$$f(\hat{y}; \theta) \approx y - \hat{y}. \tag{11}$$

The parametric model f, having parameters $\theta$, may be linear, and the parametric model f may be non-linear (e.g., a polynomial). The parameters for the prediction error model may be solved and the prediction $\hat{y}$ may be adjusted to $\tilde{y} = \hat{y} + f(\hat{y}; \theta)$. In some circumstances, this may provide a better prediction.

After block B1525, the first flow moves to block B1545.

Additionally, the second flow in FIG. 15 moves from block B1500 to block B1530, where the anomaly-detection device obtains an input image (e.g., a test image). Next, in block B1535, the anomaly-detection device preprocesses the input image. The second flow then proceeds to block B1540, where the anomaly-detection device aligns the input image with one or more of the training images.

Next, in block B1545, for each target pixel of interest, the anomaly-detection device determines the difference between the target pixel's actual value and its predicted value. The predicted value is generated using at least one of the predictive models that were generated in block B1525 and on one or more of the values of the pixels that are in the neighborhood of the target pixel (the predictive models may accept the values of the pixels that are in the neighborhood as inputs). For example, in some embodiments the difference e may be described by the following:

$$e = y - \breve{y} \quad (12)$$

where y is the target pixel's actual value and $\breve{y}$ is the predicted value.

Then, in block B1550, the anomaly-detection device detects anomalies based on the differences e. For example, the anomaly-detection device can compare the prediction error e to the median or mean prediction error for a set of example images (e.g., the images used to generate the predictive model). Additionally, the difference from the mean or median can be scaled according to the natural variation of this difference e across a set of training images. Thus, some embodiments of the anomaly-detection device generate a respective anomaly score s for each pixel of interest that can be described by $$s = \left| \frac{e - \mu_e}{\sigma_e} \right|, \quad (13)$$

where $\mu_e$ is the mean or median prediction error observed, and where $\sigma_e$ is an estimate of the standard deviation of the prediction error. $\sigma_e$ may be the actual standard deviation or may be derived using other methods, such as Median of Absolute Deviations (MAD) or inter-quartile ranges (IQR), for example.

In block B1555, the anomaly-detection device outputs or stores the detection results. Then the flow ends in block B1560.

Because some embodiments of the anomaly-detection device that use predictive models solve linear equations, these embodiments can be optimized for speed using standard linear algebra libraries or GPUs. Also, many embodiments have closed-formed solutions to their optimization problems. These closed-formed solutions may be computationally advantageous compared to other solutions.

In some embodiments, the model size for an image includes a set of regression parameters stored for each pixel position in an object image. Additional prediction correction terms may be stored for the whole image or per pixel. Also, a median or mean error and standard deviation may be stored for each pixel.

For sparse regression solutions (e.g., results of Lasso regression where many regression coefficients are zero), the predictive models can be stored as sparse vectors, which may require less space for storage. Additionally, the difference-detection operations (e.g., block B1545) may be performed faster by iterating only over the non-zero coefficient elements.

Figure 17:
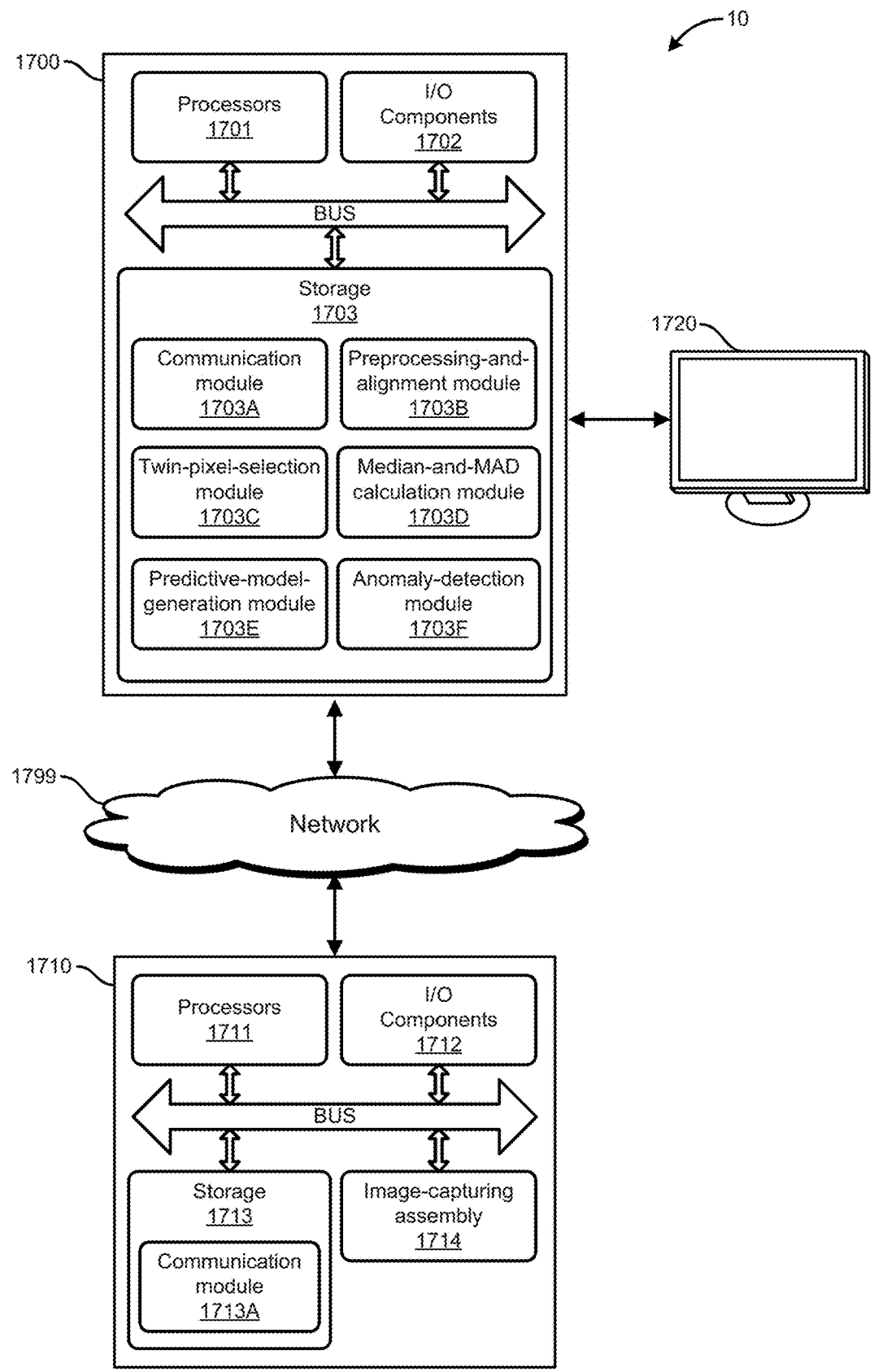
FIG. 17 illustrates an example embodiment of an anomaly-detection system.

FIG. 17 illustrates an example embodiment of an anomaly-detection system. The system 10 includes an anomaly-detection device 1700, which is a specially-configured computing device; an image-capturing device 1710; and a display device 1720. In this embodiment, the anomaly-detection device 1700 and the image-capturing device 1710 communicate via one or more networks 1799, which may include a wired network, a wireless network, a LAN, a WAN, a MAN, and a PAN. Also, in some embodiments of the system 10, the devices communicate via other wired or wireless channels.

The anomaly-detection device 1700 includes one or more processors 1701, one or more I/O components 1702, and storage 1703. Also, the hardware components of the anomaly-detection device 1700 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 1701 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1702 include communication components (e.g., a GPU, a network-interface controller) that communicate with the display device 1720, the network 1799, the image-capturing device 1710, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 1703 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1703, which may include both ROM and RAM, can store computer-readable data or computer-executable instructions.

The anomaly-detection device 1700 also includes a communication module 1703A, a preprocessing-and-alignment module 1703B, a twin-pixel-selection module 1703C, a median-and-MAD-calculation module 1703D, a predictive-model-generation module 1703E, and an anomaly-detection module 1703F. A module includes logic, computer-readable data, or computer-executable instructions. In the embodiment shown in FIG. 17, the modules are implemented in software (e.g., Assembly, C, C++, C #, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 1703. Also, in some embodiments, the anomaly-detection device 1700 includes additional or fewer modules, the modules are combined into fewer modules, or the modules are divided into more modules.

The communication module 1703A includes instructions that cause the anomaly-detection device 1700 to communicate with one or more other devices (e.g., the image-capturing device 1710, the display device 1720), for example to obtain one or more images as described in blocks B205 and B230 in FIG. 2 or in blocks B1505 and B1530 in FIG. 15.

The preprocessing-and-alignment module 1703B includes instructions that cause the anomaly-detection device 1700 to perform preprocessing on one or more images and to align two or more images (e.g., by aligning the images to a training image), for example as described in blocks B210-B215 and B235-B240 in FIG. 2 or in blocks B1510-B1515 and B1535-B1540 in FIG. 15.

The twin-pixel-selection module 1703C includes instructions that cause the anomaly-detection device 1700 to select respective twin pixels for one or more target pixels, for example as described in blocks B220 and B245 in FIG. 2, in blocks B700-B750 in FIG. 7, or in block B1520 in FIG. 15.

The median-and-MAD-calculation module 1703D includes instructions that cause the anomaly-detection device 1700 to calculate differences between target pixels and their respective twin pixels, calculate the median of the differences, calculate the MAD of the differences, or calculate MAD scores based on the differences, for example as described in block B225 in FIG. 2.

The predictive-model-generation module 1703E includes instructions that cause the anomaly-detection device 1700 to generate respective predictive models that predict the values of target pixels, for example as described in block B1525 in FIG. 15.

The anomaly-detection module 1703F includes instructions that cause the anomaly-detection device 1700 to detect anomalies in one or more input images based on the pixel values in the one or more images, for example based on the twin-pixel differences in the input image (e.g., based on the MAD scores of the twin-pixel differences) or based on the differences between the actual values of the pixels in the input image and their predicted values. In some embodiments, the anomaly-detection module 1703F includes instructions that cause the anomaly-detection device 1700 to perform one or more of the operations in blocks B250-B265 in FIG. 2 and in blocks B1545-B1550 in FIG. 15.

The image-capturing device 1710 includes one or more processors 1711, one or more I/O components 1712, storage 1713, a communication module 1713A, and an image-capturing assembly 1714. The image-capturing assembly 1714 includes one or more image sensors and may include one or more lenses and an aperture. The communication module 1713A includes instructions that, when executed, or circuits that, when activated, cause the image-capturing device 1710 to capture an image, receive a request for an image from a requesting device, retrieve a requested image from the storage 1713, or send an image (e.g., a requested image) to another device (e.g., the anomaly-detection device 1700).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
   one or more computer-readable storage media; and
   one or more processors in communication with the one or more computer-readable storage media to cause the device to perform operations comprising:
   obtaining training images;
   obtaining a test image;
   selecting associated pixels in the training images for a first target pixel in the training images;
   calculating one or more value relationships between a value of the first target pixel and respective values of the associated pixels in the training images, wherein the one or more value relationships between the value of the first target pixel and the respective values of the associated pixels in the training images include:
   a centrality of respective value differences between the value of the first target pixel and the respective values of the associated pixels in the training images, and
   a variation of the respective value differences between the value of the first target pixel and the respective values of the associated pixels in the training images;
   selecting one or more associated pixels in the test image for a first target pixel in the test image; and
   detecting an anomaly in the first target pixel in the test image based on the one or more value relationships between the value of the first target pixel and the respective values of the associated pixels in the training images and on one or more value relationships between a value of the first target pixel and respective values of the one or more associated pixels in the test image.

2. The device of claim 1, wherein the associated pixels in the training images are separated from each other by pixels that are not the associated pixels.

3. The device of claim 1, wherein selecting the associated pixels in the training images for the first target pixel in the training images includes:
   selecting one or more associated pixels in the training images that are located a first distance range away from the first target pixel, and
   selecting one or more associated pixels in the training images that are located a second distance range away from the first target pixel, wherein the first distance range is different from the second distance range.

4. The device of claim 1, wherein the training images and the test image both depict instances of an object,
   wherein a position on the object that is depicted by the first target pixel in the training images is similar to a position on the object that is depicted by the first target pixel in the test image.

5. The device of claim 1, wherein the operations further comprise:
   selecting associated pixels in the training images for a second target pixel in the training images;
   calculating one or more value relationships between a value of the second target pixel and respective values of the associated pixels in the training images;
   selecting one or more associated pixels in the test image for a second target pixel in the test image; and
   detecting an anomaly in the second target pixel in the test image based on the one or more value relationships between the value of the second target pixel and the respective values of the associated pixels in the training images and on one or more value relationships between a value of the second target pixel and respective values of the one or more associated pixels in the test image.

6. A device comprising:
one or more computer-readable storage media; and
one or more processors in communication with the one or more computer-readable storage media to cause the device to perform operations comprising:
obtaining one or more training images;
obtaining a test image;
selecting one or more associated pixels in the one or more training images for a first target pixel in the one or more training images;
selecting one or more associated pixels in the test image for a first target pixel in the test image;
generating a predicted target-pixel value for the first target pixel in the test image based on respective values of the one or more associated pixels in the test image, on a value of the first target pixel in the one or more training images, and on respective values of the one or more associated pixels in the one or more training images;
generating a target-pixel-value-to-predicted-target-pixel-value difference based on the predicted target-pixel value and on a value of the first target pixel in the test image; and
detecting an anomaly in the first target pixel in the test image based at least in part on the target-pixel-value-to-predicted-target-pixel-value difference.

7. A method comprising:
obtaining training images;
obtaining a test image;
selecting associated pixels in the training images for a first target pixel in the training images;
calculating one or more value relationships between a value of the first target pixel and respective values of the associated pixels in the training images, wherein the one or more value relationships between the value of the first target pixel and the respective values of the associated pixels in the training images include:
a centrality of respective value differences between the value of the first target pixel and the respective values of the associated pixels in the training images, and
a variation of the respective value differences between the value of the first target pixel and the respective values of the associated pixels in the training images;
selecting one or more associated pixels in the test image for a first target pixel in the test image; and
detecting an anomaly in the first target pixel in the test image based on the one or more value relationships between the value of the first target pixel and the respective values of the associated pixels in the training images and on one or more value relationships between a value of the first target pixel and respective values of the associated pixels in the test image.

8. The method of claim 7, wherein the associated pixels in the training images are separated from each other by pixels that are not the associated pixels.

9. A method comprising:
obtaining one or more training images;
obtaining a test image;
selecting one or more associated pixels in the one or more training images for a first target pixel in the one or more training images;
selecting one or more associated pixels in the test image for a first target pixel in the test image;
generating a predicted target-pixel value for the first target pixel in the test image based on respective values of the one or more associated pixels in the test image, on a value of the first target pixel in the one or more training images, and on respective values of the one or more associated pixels in the one or more training images;
generating a target-pixel-value-to-predicted-target-pixel-value difference based on the predicted target-pixel value and on a value of the first target pixel in the test image; and
detecting an anomaly in the first target pixel in the test image based at least in part on the target-pixel-value-to-predicted-target-pixel-value difference.

10. The method of claim 9, wherein selecting the one or more associated pixels in the one or more training images for the first target pixel in the one or more training images includes:
selecting one or more associated pixels in the one or more training images that are located a first distance range away from the first target pixel, and
selecting one or more associated pixels in the one or more training images that are located a second distance range away from the first target pixel, wherein the first distance range is different from the second distance range.

11. The method of claim 10, wherein the one or more training images and the test image both depict instances of an object,
wherein a position on the object that is depicted by the first target pixel in the one or more training images is similar to a position on the object that is depicted by the first target pixel in the test image.

12. The method of claim 9, further comprising:
selecting one or more associated pixels in the training images for a second target pixel in the one or more training images;
selecting one or more associated pixels in the test image for a second target pixel in the test image;
generating a second predicted target-pixel value for the second target pixel in the test image based
on respective values of the one or more associated pixels, of the second target pixel, in the test image,
on a value of the second target pixel in the one or more training images, and
on respective values of the one or more associated pixels, of the second target pixel, in the one or more training images;
generating a second target-pixel-value-to-predicted-target-pixel-value difference based on the second predicted target-pixel value and on a value of the second target pixel in the test image; and
detecting a second anomaly in the second target pixel in the test image based at least in part on the second target-pixel-value-to-predicted-target-pixel-value difference.

13. One or more non-transitory computer-readable media storing instructions that, when executed by one or more computing devices, cause the one or more computing devices to perform operations comprising:
obtaining training images;
obtaining a test image;
selecting associated pixels in the training images for a first target pixel in the training images;
calculating one or more value relationships between a value of the first target pixel and respective values of the associated pixels in the training images, wherein the one or more value relationships between the value of the first target pixel and the respective values of the associated pixels in the training images include:
- a centrality of respective value differences between the value of the first target pixel and the respective values of the associated pixels in the training images, and
- a variation of the respective value differences between the value of the first target pixel and the respective values of the associated pixels in the training images;

selecting one or more associated pixels in the test image for a first target pixel in the test image; and detecting an anomaly in the first target pixel in the test image based on the one or more value relationships between the value of the first target pixel and the respective values of the associated pixels in the training images and on one or more value relationships between a value of the first target pixel and respective values of the associated pixels in the test image.

14. The one or more non-transitory computer-readable media of claim 13, wherein the associated pixels in the training images are separated from each other by pixels that are not the associated pixels.

15. The one or more non-transitory computer-readable media of claim 13, wherein the training images and the test image both depict instances of an object,
wherein a position on the object that is depicted by the first target pixel in the training images is similar to a position on the object that is depicted by the first target pixel in the test image.

16. One or more non-transitory computer-readable media storing instructions that, when executed by one or more computing devices, cause the one or more computing devices to perform operations comprising:
obtaining one or more training images;
obtaining a test image;
selecting one or more associated pixels in the one or more training images for a first target pixel in the one or more training images;
selecting one or more associated pixels in the test image for a first target pixel in the test image;
generating a predicted target-pixel value for the first target pixel in the test image based on respective values of the one or more associated pixels in the test image, on a value of the first target pixel in the one or more training images, and on respective values of the one or more associated pixels in the one or more training images;
generating a target-pixel-value-to-predicted-target-pixel-value difference based on the predicted target-pixel value and on a value of the first target pixel in the test image; and
detecting an anomaly in the first target pixel in the test image based at least in part on the target-pixel-value-to-predicted-target-pixel-value difference.

17. The one or more non-transitory computer-readable media of claim 16, wherein selecting the one or more associated pixels in the one or more training images for the first target pixel in the one or more training images includes:
selecting one or more associated pixels in the one or more training images that are located a first distance range away from the first target pixel, and
selecting one or more associated pixels in the one or more training images that are located a second distance range away from the first target pixel, wherein the first distance range is different from the second distance range.

* * * * *